US007785538B2

(12) United States Patent
Kawahara

(10) Patent No.: US 7,785,538 B2
(45) Date of Patent: Aug. 31, 2010

(54) FLUID HANDLING DEVICE

(75) Inventor: Noriyuki Kawahara, Kawaguchi (JP)

(73) Assignee: Enplas Corporation, Saitama (JP)

( * ) Notice: Subject to any disclaimer, the term of this patent is extended or adjusted under 35 U.S.C. 154(b) by 174 days.

(21) Appl. No.: 12/148,198

(22) Filed: Apr. 17, 2008

(65) Prior Publication Data

US 2009/0047180 A1 Feb. 19, 2009

(30) Foreign Application Priority Data

Apr. 19, 2007 (JP) ............................ 2007-110276

(51) Int. Cl.
*B01L 3/00* (2006.01)
*G01N 1/10* (2006.01)

(52) U.S. Cl. ....................... 422/102; 356/244; 356/246; 435/288.4; 435/294.1; 422/58; 422/59; 436/809

(58) Field of Classification Search ............. 435/288.4, 435/294.1

See application file for complete search history.

(56) References Cited

U.S. PATENT DOCUMENTS 5,084,246 A * 1/1992 Lyman et al. ............... 422/101
2006/0266969 A1 * 11/2006 Kawahara et al. ........ 251/149.6
2007/0111304 A1 * 5/2007 Ohse et al. ............... 435/287.2
2007/0217955 A1 * 9/2007 Kawahara et al. ............. 422/99

FOREIGN PATENT DOCUMENTS

JP 62-257048 11/1987

* cited by examiner

*Primary Examiner*—Jill Warden
*Assistant Examiner*—Jennifer Wecker
(74) *Attorney, Agent, or Firm*—William L. Androlia; H. Henry Koda

(57) ABSTRACT

A fluid handling device including an eaves section of a first side wall engaged with a recess of a strip plate including a plurality of wells using concavity and convexity and an eaves section of a second side wall engaged with a recess of the strip plate using concavity and convexity. Slits are further formed in a corner section of the second side wall connecting to another side wall, so as to extend downwards from an upper end section. The second side wall also is partially cut away from the other side wall and is more easily deformed than the first side wall.

3 Claims, 20 Drawing Sheets

FLUID HANDLING DEVICE

BACKGROUND OF THE INVENTION

1. Field of the Invention

The present invention relates to a fluid handling device. In particular, the present invention relates to a fluid handling device that can be used as a sample analyzing device that analyzes a sample, such as a functional material represented by a biological material.

2. Description of the Related Art

In a microplate serving as a fluid handling device used in analysis and the like that detects a biological material through allowing a reactant caused by an antigen-antibody reaction of the biological material to become visually recognizable or measuring fluorescence or absorption of light, a plurality of fine recesses (wells) are formed into a matrix (for example, a total of 96 wells arrayed so that a vertical row includes 8 wells and a horizontal row includes 12 wells). The wells hold specimens and the like. A specimen and a reagent are injected into each well. The shape and configuration of a microplate such as this are devised depending on a configuration of an analyzing device and an analyzing method.

FIRST CONVENTIONAL EXAMPLE

In a microplate 101 shown in FIG. 23 and FIG. 24, 12 strip plates (unit microplate) 103 are arranged horizontally and incorporated into a frame 102. Eight wells 104 are formed in a single row on each strip plate 103. As a result, 96 wells 104 are arrayed to form a matrix. In the microplate 101, to prevent disengagement of the strip plates 103 from the frame 102 during a manual operation such as transportation and infusion of a reagent, an operator fits a frame-shaped cover 105 onto an upper edge section of the frame 102. The frame-shaped cover 105 holds the strip plate 103 to the upper edge section of the frame 102 (refer to Patent Literature 1).

SECOND CONVENTIONAL EXAMPLE

A microplate 201 shown in FIG. 25 uses a following holding mechanism (refer to Patent Literature 2). Projections 220 and 221 formed on both longitudinal-direction end sections of a strip plate 203 push apart eaves sections 224 and 225 on side walls 205 and 206 of the frame 202. The strip plate 203 is inserted into the frame 202. The eaves section 224 of the frame 202 is held between a shoulder section 211 and the projection 220 of the strip plate 203. The eaves section 225 of the frame 202 is held between a shoulder section 212 and the projection 221 of the strip plate 203. As a result, the frame 202 holds the strip plate 203.

Patent Literature 1: Japanese Patent Laid-open Publication No. Showa 62-257048

Patent Literature 2: U.S. Pat. No. 5,084,246

A following is effective for reducing a number of components in the microplate 101 of the first conventional example shown in FIG. 23 and FIG. 24 and reducing size and weight of the microplate 101. The holding mechanism of the strip plate 203 and the frame 202 in the microplate 201 of the second conventional example shown in FIG. 25 is applied to the frame 102 and the strip plate 103 in the microplate 101 of the first conventional example, thereby making the cover 105 (a component preventing the strip plate 103 incorporated into the frame 102 from disengaging with the frame 102) unnecessary.

However, when the holding mechanism of the second conventional example is simply applied to the microplate 101 of the first conventional example, a strong force is required to attach and detach the strip plate 103 to and from the frame 102 because of an engagement state between the eaves sections formed on the frame 102 and the projections formed on the strip plate 103 (for example, variations in a degree of engagement between the eaves sections and the projections caused by manufacturing errors in the frame 102 and the strip plate 103). Attachment and detachment of the strip plate 103 to and from the frame 102 may not be smoothly performed. When the strip plate 103 holding specimens and the like within the wells 104 is detached from the frame 103 when the attachment and detachment of the strip plate 103 to and from the frame 102 cannot be smoothly performed, the specimens and the like within the wells 104 may spill outside of the wells 104.

SUMMARY OF THE INVENTION

Therefore, an object of the present invention is to make a separate component for preventing disengagement of a strip plate incorporated into a frame unnecessary, to allow attachment and detachment of the strip plate to and from the frame by a single operation, and to allow the strip plate and the frame to be smoothly attached and detached without the strip plate disengaging from the frame during a manual operation such as transportation and without specimens and the like within wells spilling when an external force is applied to attach and detach the strip plate to and from the frame.

An invention according to a first aspect is related to a fluid handling device in which a plurality of rectangular planar-shaped strip plates on which a plurality of wells are formed in a single row or more are detachably incorporated into a frame having a square planar-shaped space surrounded by four continuous side walls, thereby arranging the wells in a form of a matrix. In the invention, the strip plate includes shoulder sections on one end section side and another end section side in a longitudinal direction. The shoulder sections are placed on upper end sections of a pair of opposing side walls among the four side walls. The strip plate also includes a concave-convex engaging section that engages with a locking section formed on a side surface positioned on the space side of the opposing pair of side walls among the four side walls using concavity and convexity. When the strip plate is incorporated into the frame, the concave-convex engaging section engages with the locking section using concavity and convexity by the concave-convex engaging section deforming at least one side wall of the pair of side walls. When the strip plate is removed from the frame, the engagement between the concave-convex engaging section and the locking section using concavity and convexity is released by the concave-convex engaging section deforming at least one side wall of the pair of side walls. A slit is formed on the frame near a corner between at least one side wall of the pair of side walls and another side wall connected to the one side wall, so as to extend from an upper end section to a lower end section of the one side wall.

An invention according to a second aspect is related to a fluid handling device in which a plurality of rectangular planar-shaped strip plates on which a plurality of wells are formed in a single row or more are detachably incorporated into a frame having a square planar-shaped space surrounded by four continuous side walls, thereby arranging the wells in a form of a matrix. In the invention, the strip plate includes shoulder sections on one end section side and another end section side in a longitudinal direction. The shoulder sections are placed on upper end sections of a pair of opposing side walls among the four side walls. The strip plate also includes a concave-convex engaging section that engages with a locking section formed on a side surface positioned on the space side of the opposing pair of side walls among the four side walls using concavity and convexity. When the strip plate is incorporated into the frame, the concave-convex engaging section engages with the locking section using concavity and convexity by the concave-convex engaging section deforming at least one side wall of the pair of side walls. When the strip plate is removed from the frame, the engagement between the concave-convex engaging section and the locking section using concavity and convexity is released by the concave-convex engaging section deforming at least one side wall of the pair of side walls. A slit is formed on the frame near a corner between at least one side wall of the pair of side walls and another side wall connected to the one side wall, so as to extend from an upper end section to a lower end section of the other side wall.

An invention according to a second aspect is related to a fluid handling device in which a plurality of rectangular planar-shaped strip plates on which a plurality of wells are formed in a single row or more are detachably incorporated into a frame having a square planar-shaped space surrounded by four continuous side walls, thereby arranging the wells in a form of a matrix. In the invention, the strip plate includes shoulder sections on one end section side and another end section side in a longitudinal direction. The shoulder sections are placed on upper end sections of a pair of opposing side walls among the four side walls. The strip plate also includes a concave-convex engaging section that engages with a locking section formed on a side surface positioned on the space side of the opposing pair of side walls among the four side walls using concavity and convexity. When the strip plate is incorporated into the frame, the concave-convex engaging section engages with the locking section using concavity and convexity by the concave-convex engaging section deforming at least one side wall of the pair of side walls. When the strip plate is removed from the frame, the engagement between the concave-convex engaging section and the locking section using concavity and convexity is released by the concave-convex engaging section deforming at least one side wall of the pair of side walls. A thin-walled section is formed on the frame near a corner between at least one side wall of the pair of side walls and another side wall connected to the one side wall, in a predetermined area from an upper end section to a lower end section of the one side wall.

EFFECT OF THE INVENTION

In the present invention, when the strip plate is attached to and detached from the frame, the concave-convex engaging section of the strip plate deforms the side wall of the frame and the concave-convex engaging section of the strip plate engages with and disengages from the locking section of the frame by a single operation (an operation in which the strip plate is inserted into the frame or an operation in which the strip plate is removed from the frame). Therefore, a separate component preventing detachment of the strip plate incorporated into the frame is not required.

In the present invention, the strip plate is not detached from the frame as long as the side wall of the frame is not deformed by an external force being applied to the strip plate. Therefore, the strip plate does not easily detach from the frame during a manual operation, such as transportation.

In the inventions according to the first aspect and the second aspect, at least one side wall of the pair of side walls engaging with the strip plate using concavity and convexity is more easily deformed as a result of an effect of the slit provided near the corner section with the other side wall, compared to the one side wall near the corner section when the slit is not provided. Therefore, when the strip plate and the frame are attached and detached, the external force applied to the strip plate can be reduced and the attachment and detachment operations of the strip plate and the frame can be smoothly performed. As a result, in the inventions according to the first aspect and the second aspect, when the strip plate storing a specimen and the like within the wells is attached to and detached from the frame, the specimen and the like within the wells can be prevented from spilling as a result of impact when the strip plate is attached to and detached from the frame.

In the invention according to the third aspect, at least one side wall of the pair of side walls engaging with the strip plate using concavity and convexity is more easily deformed as a result of an effect of the thin-walled section provided near the corner section with the other side wall, compared to the one side wall near the corner section when the slit is not provided. Therefore, when the strip plate and the frame are attached and detached, the external force applied to the strip plate can be reduced and the attachment and detachment operations of the strip plate and the frame can be smoothly performed. As a result, in the invention according to the third aspect, when the strip plate storing a specimen and the like within the wells is attached to and detached from the frame, the specimen and the like within the wells can be prevented from spilling as a result of impact when the strip plate is attached to and detached from the frame.

BRIEF DESCRIPTION OF THE DRAWINGS

FIG. 6A is a front view of the strip plate;

FIG. 6B is a planar view of the strip plate;

FIG. 6C is a side view of the strip plate viewed from one side;

FIG. 6D is a side view of the strip plate viewed from another side;

FIG. 6E is a rear view of the strip plate;

FIG. 6F is a partially enlarged view of FIG. 6A;

DETAILED DESCRIPTION OF THE PREFERRED EMBODIMENT

Embodiments of the present invention will be described in detail with reference to the drawings.

First Embodiment

Overall Configuration of a Fluid Handling Device

Figure 1:
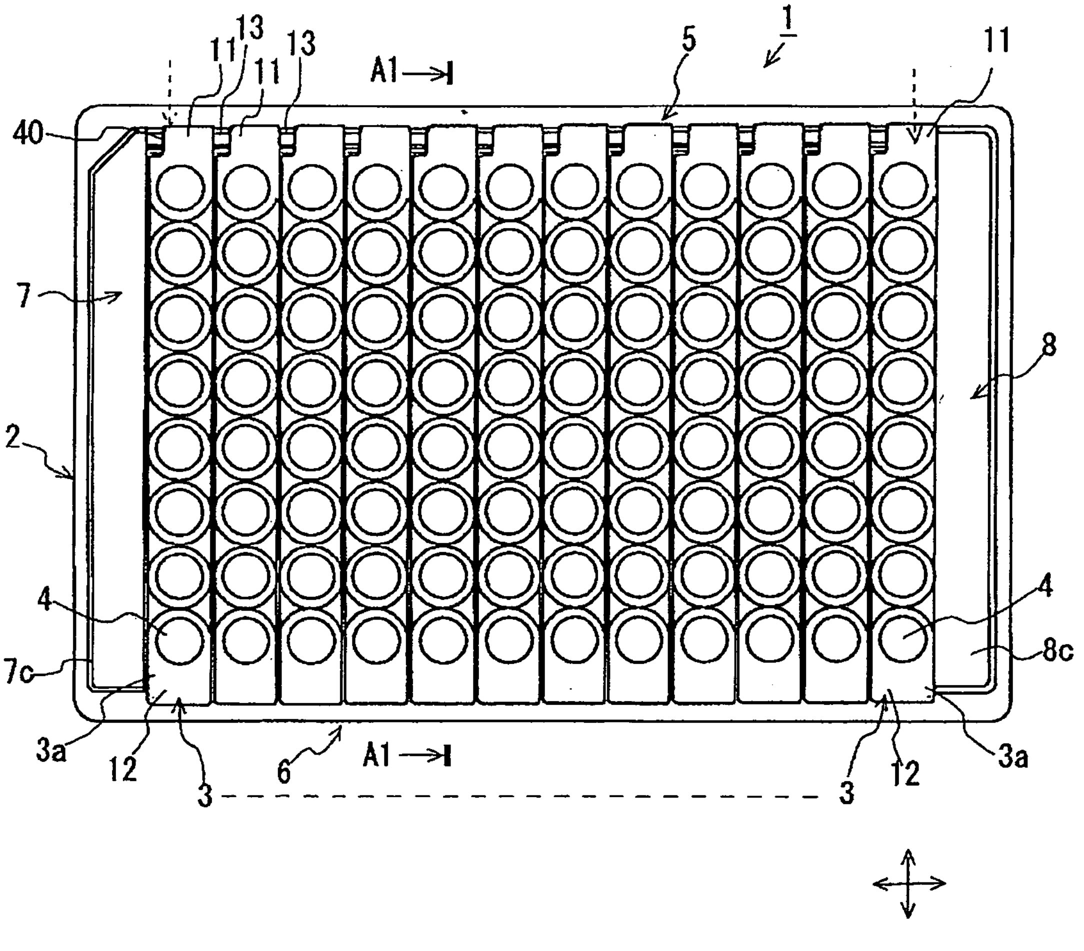
FIG. 1 is a planar view of a fluid handling device according to a first embodiment of the present invention.
Figure 2:
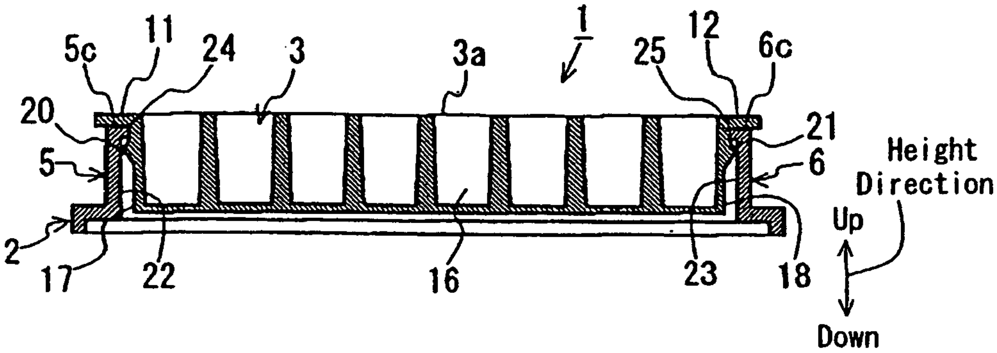
FIG. 2 is a cross-sectional view of the fluid handling device, taken along line A1-A1 in FIG. 1.

FIG. 1 and FIG. 2 show a fluid handling device 1 according to a first embodiment of the present invention. FIG. 1 is a planar view of the fluid handling device 1. FIG. 2 is a cross-sectional view of the fluid handling device 1 in FIG. 1 taken along line A1-A1. The fluid handling device 1 shown in FIG. 1 and FIG. 2 includes a frame 2 and a plurality of strip plates 3. The strip plates 3 are detachably joined with the frame 2. In a strip plate 3, eight wells (recesses holding specimens and the like) 4 are formed in a single row in a vertical direction of FIG. 1. The strip plates 3 are arranged in 12 rows in a horizontal direction of FIG. 1. As a result, in the fluid handling device 1, a total of 96 wells 4 are arranged in a form of a matrix, as shown in FIG. 1. The frame 2 and the strip plate 3 are formed from a synthetic resin material, such as polystyrene and polycarbonate. In the fluid handling device 1 in FIG. 2, an opening end side of the well 4 is a top section and a side opposite of the top section is a bottom section.

(Configuration of the Frame)

As shown in detail in FIG. 1 to FIG. 5, the frame 2 includes a space 10 surrounded by four side walls 5 to 8. The four side walls 5 to 8 of the frame 2 are connected and integrally formed. The four side walls 5 to 8 are formed so as to surround the space 10. The space 10 has a rectangular planar shape (a planar shape in FIG. 4A is a rectangle that is longer in the horizontal direction than in the vertical direction). The four side walls 5 to 8 of the frame 2 are formed from a pair of side walls 5 and 6 and a pair of other side walls 7 and 8. The pair of side walls 5 and 6 are positioned facing each other on the long sides of the space 10 having the rectangular planar shape. The pair of other side walls 7 and 8 connect opposing end sections of the pair of side walls 5 and 6. Each side wall 5 to 8 of the frame 2 include rising side wall sections 5*a* to 8*a* extending in the vertical direction and base side wall sections 5*b* to 8*b* that project outward (a side opposite of the space 10 side) from a bottom end side of the rising side wall sections 5*a* to 8*a* in the form of shoulders. Here, for convenience in explanation, in FIG. 4A, among the four side walls 5 to 8 of the frame 2, one wall (upper side in FIG. 4A) of the pair of side walls 5 and 6 positioned on the long sides of the space 10 is a first side wall 5. The other wall (lower side in FIG. 4A) of the pair of side walls 5 and 6 is a second side wall 6. For convenience in explanation, in FIG. 4A, among the four side walls 5 to 8 of the frame 2, one wall (left-hand side in FIG. 4A) of the pair of side walls 7 and 8 positioned facing each other on the short sides of the space 10 is a third side wall 7. The other wall (right-hand side in FIG. 4A) of the pair of side walls 5 and 6 is a fourth side wall 8.

As shown in FIG. 1 to FIG. 4, shoulder sections 11 and 12 of the strip plate 3 are placed on upper end sections 5*c* and 6*c* of the pair of side walls (first side wall 5 and second side wall 6) of the frame 2. The upper end sections 5*c* and 6*c* are lower than upper surfaces 7*c* and 8*c* of the third side wall 7 and the fourth side wall 8 (by a length equal to a thickness of the shoulder sections 11 and 12 of the strip plate 3) so that, an upper surface 3*a* of the strip plate is positioned on a same plane (same height) as the upper surfaces 7*c* and 8*c* of the third side wall 7 and the fourth side wall 8 when the shoulder sections 11 and 12 of the strip plate 3 are placed on the upper end sections 5*c* and 6*c*.

As shown in FIG. 1 to FIG. 4, positioning projections 13 are formed projecting from the upper end section 5*c* of the first side wall 5. The positioning projections 13 are used to position each strip plate 3 at a predetermined position. The shoulder section 11 positioned on one longitudinal direction end side (upper end side in FIG. 1) of the strip plates 3 in the second to eleventh rows is engaged between the positioning projections 13 and 13 of the first side wall 5. The strip plates 3 in the second to eleventh rows are positioned relative to the frame 3. The shoulder section 11 positioned on one longitudinal direction end side of the strip plate 3 in the first row is engaged between the third side wall 7 and the positioning projection 13 adjacent to the third side wall 7. The strip plate 3 in the first row is positioned relative to the frame 3. The shoulder section 11 positioned on one longitudinal direction end side of the strip plate 3 in the twelfth row is engaged between the fourth side wall 8 and the positioning projection 13 adjacent to the fourth side wall 8. The strip plate 3 in the twelfth row is positioned relative to the frame 3. In each strip plate 3 in the first row to the twelfth row, the shoulder section 11 on the one longitudinal direction end side is placed on the upper end section 5*c* of the first side wall 5, and each strip plate 3 is positioned relative to the height direction of the first side wall 5.

As shown in FIG. 1 to FIG. 4, positioning recesses 14 are formed on an upper end section 6*c* of the second side wall 6 so that the second side wall 6 is partially notched with grooves. The positioning recesses 14 are used to position each strip plate 3 at the predetermined position. The positioning recesses 14 on the second side walls 6 are formed corresponding to each strip plate 3 in the first to twelfth rows. As a result of positioning projections 15 of each strip plate 3 in the first to twelfth rows engaging with the positioning recesses 14 (see to FIG. 6), a shoulder section 12 on another longitudinal direction end side of the strip plates 3 in the first to twelfth rows is positioned relative to the frame 2. In each strip plate 3 in the first to twelfth rows, the shoulder section 12 on the other longitudinal direction end side is placed on the upper end section 6*c* of the second side wall 6, and each strip plate 3 is positioned in relation to the height direction of the second side wall 6.

Figure 4:
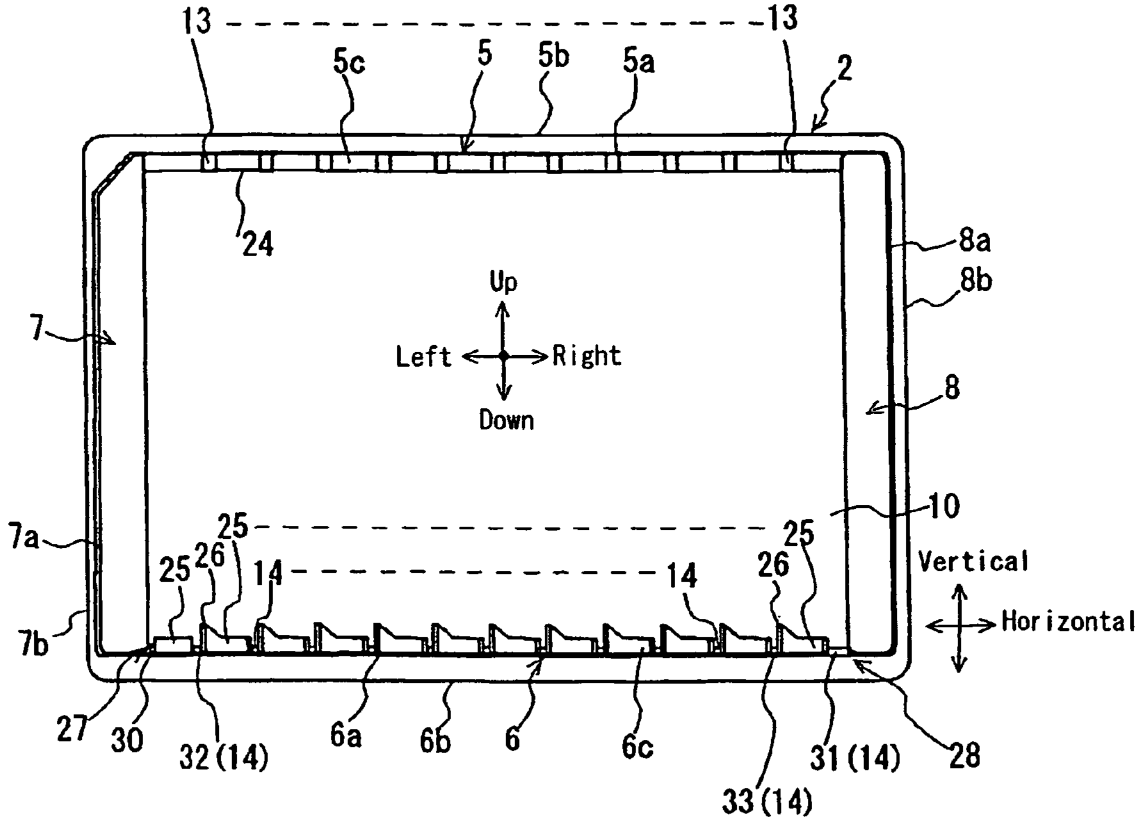
FIG. 4A is a planar view of the frame configuring the fluid handling device in FIG. 1.
FIG. 4B is a side view of the frame viewed from a second side wall side.
FIG. 4C is a side view of the frame viewed from a first side wall side.
Figure 4:
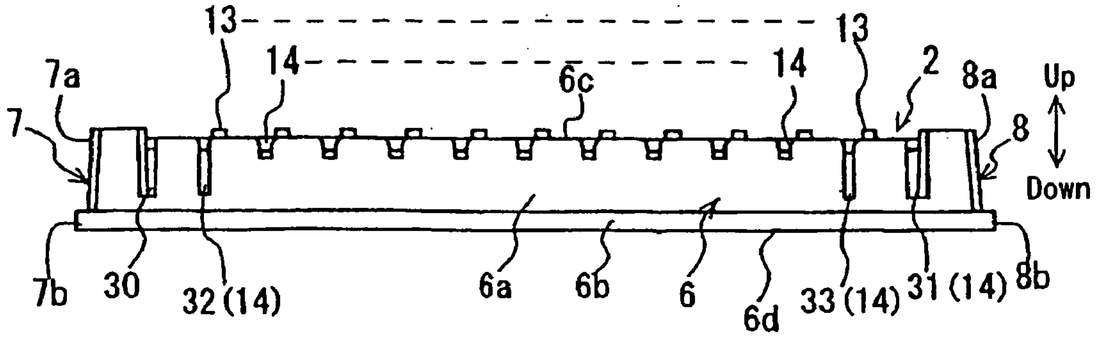
Figure 4:
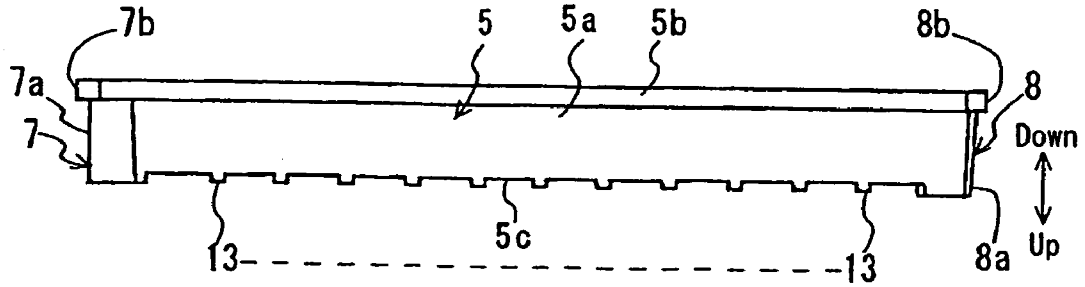
Figure 5:
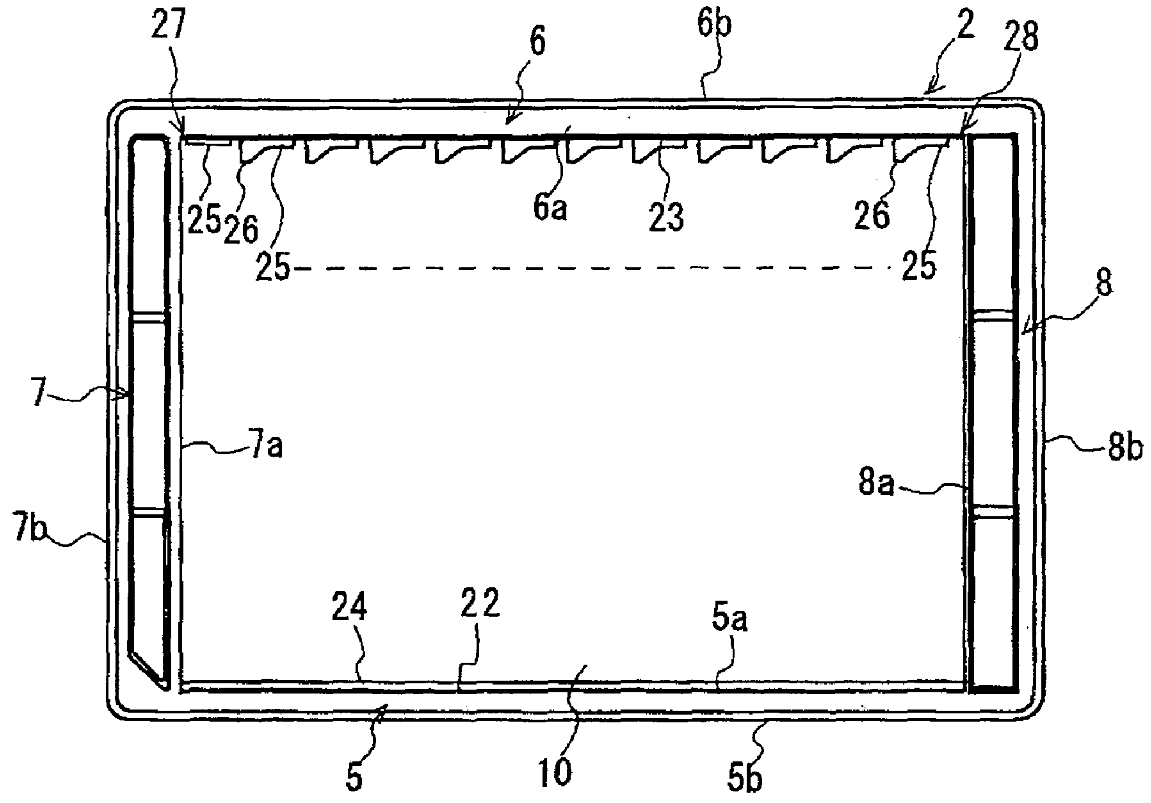
FIG. 5 is a rear view of the frame configuring the fluid handling device in FIG. 1.

As shown in FIG. 2, FIG. 4, and FIG. 5, eaves sections 24 (locking sections) are formed from the third side wall 7 to the fourth side wall 8 on the upper end section 5*c* side of an inner wall 22. The inner wall 22 is a side surface of the first side wall 5 on a space 10 side. The eaves sections 23 are portions of the upper end section 5*c* of the first side wall 5 projecting toward the space 10 side. Eaves sections 25 (locking sections) are formed on the upper end section 6*c* side of an inner wall 23. The inner wall 23 is a side surface of the second side wall 6 on the space 10 side. The eaves sections 25 are portions of the upper end section 6*c* of the second side wall 6 positioned corresponding to each strip plate 3 incorporated into the frame 2 and projecting toward the space 10 side. Other eaves sections 25 of the eaves sections 25 on the second wall 6 excluding the eaves section 25 corresponding to the strip plate 3 in the first row have an arc-shaped portion 26 (see FIG. 6) that projects towards the space 10 side in a large arc so as to engage with a side surface 18. The side surface 18 is a side surface of a main body portion 16 of the strip plate 3 that is formed into a curved surface. The arc-shaped portion 26 functions to prevent the strip plates 3 from being incorporated into the frame 2 at an angle (for example, the shoulder section 11 on one end side of the strip plate 3 in the second row is incorporated at the predetermined position in the second row and the shoulder section 12 on the other end side of the strip plate 3 in the second row is incorporated at a position in the first row or the third row) (see FIG. 1).

Figure 3:
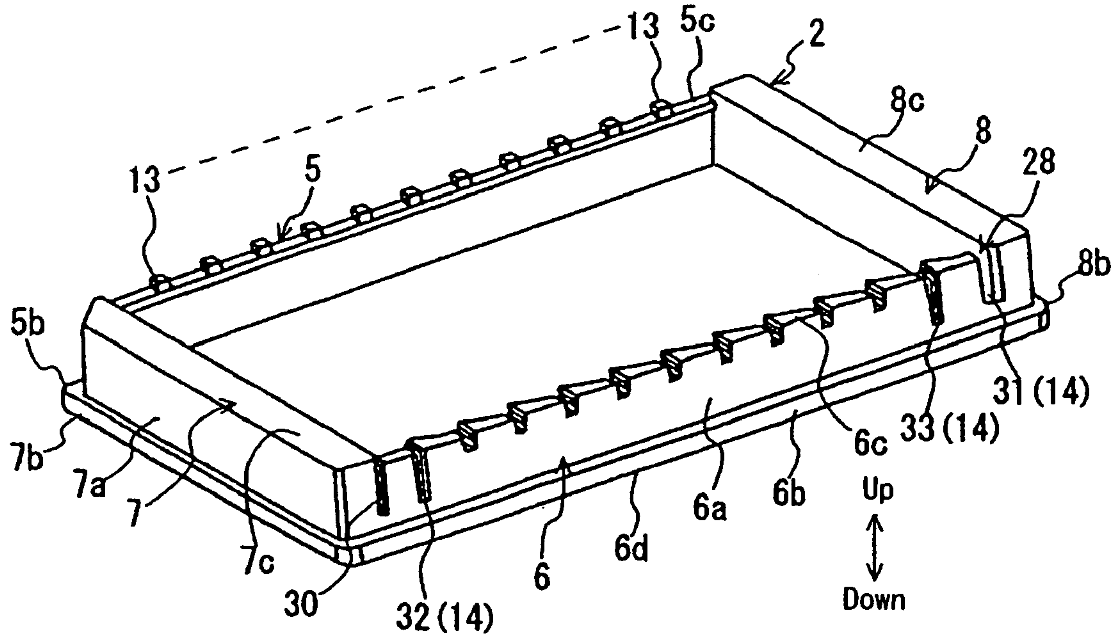
FIG. 3 is an outline perspective view of a frame configuring the fluid handling device in FIG. 1.
Figure 7:
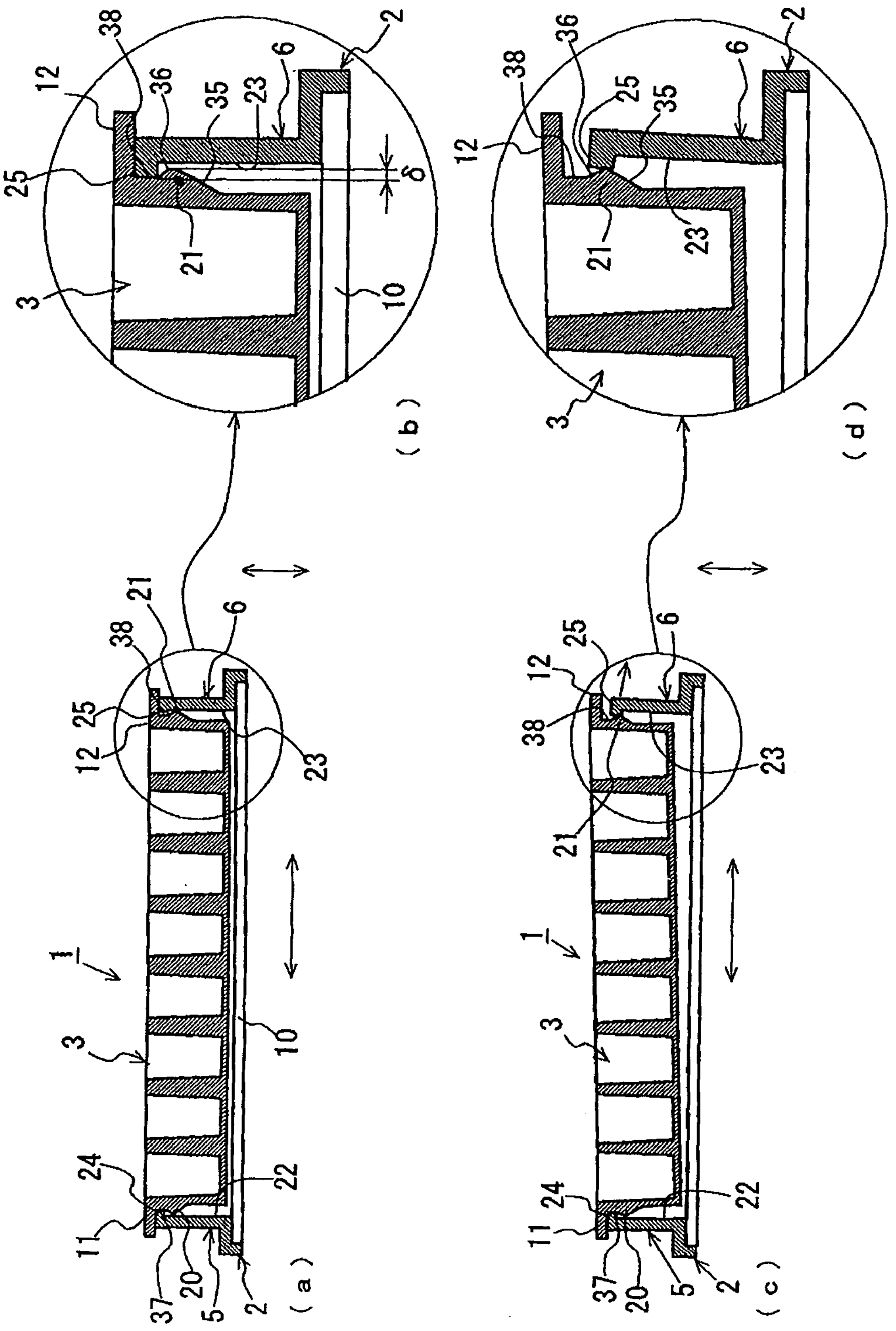
FIG. 7A is a cross-sectional view of a state after assembly of a fluid handling device is completed, corresponding to FIG. 2.
FIG. 7B is a partially enlarged view of the cross-sectional view in FIG. 7A.
FIG. 7C is a cross-sectional view explaining an assembly procedure or a detaching procedure of the fluid handling device.
FIG. 7D is a partially enlarged view of the cross-sectional view in FIG. 7C.

As shown in FIG. 3 and FIG. 4, slits 30 and 31 are respectively formed on a corner section 27 between the second side wall 6 and the third side wall 7 and a corner section 28 between the second side wall 6 and the fourth side wall 8. The slits 30 and 31 are formed extending from the upper end section 6*c* side of the second side wall 6 towards a lower end side 6*d* so that a predetermined area on the upper end section 6*c* side of the second side wall 6 is cut away from the third side wall 6 and the fourth side wall 8. The second side wall 6 is more easily deformed compared to the first side wall 5, the third side wall 7, and the fourth side wall 8. In the second side wall 6, the positioning recess 14 of the strip plate 3 in the first row and the positioning recess 14 of the strip plate 3 in the eleventh row are cut from the upper end section 6*c* towards the lower end section 6*d* side by a length equal to the lengths of the slits 30 and 31, forming sub-slits 32 and 33. As a result, in the second side wall 6 of the frame 2 according to the embodiment, a portion corresponding to an incorporation position of the strip plate 3 in the first row and a portion corresponding to an incorporation position of the strip plate 3 in the twelfth row are more easily deformed compared to when merely the pair of slits 30 and 31 are formed. Deformation of the portion corresponding to the incorporation position of the strip plate 3 in the first row to the portion corresponding to the incorporation position of the strip plate 3 in the twelfth row can be smoothly and equally deformed. Contact pressure with the strip plate 3 when the strip plate 3 is attached and detached is equalized (see FIG. 1 and FIG. 7). The slit 31 positioned at the corner section 28 between the second side wall 6 and the fourth side wall 8 also serve as the positioning recess 14 of the strip plate 3 in the twelfth row. The lengths (length extending from the upper end section 6*c* towards the lower end section 6*d* side) and widths of the slits 30 and 31 and the sub-slits 32 and 33 are set to optimal values taking into consideration the thickness of the second side wall 6 and the like.

(Configuration of the Strip Plate)

Figure 6:
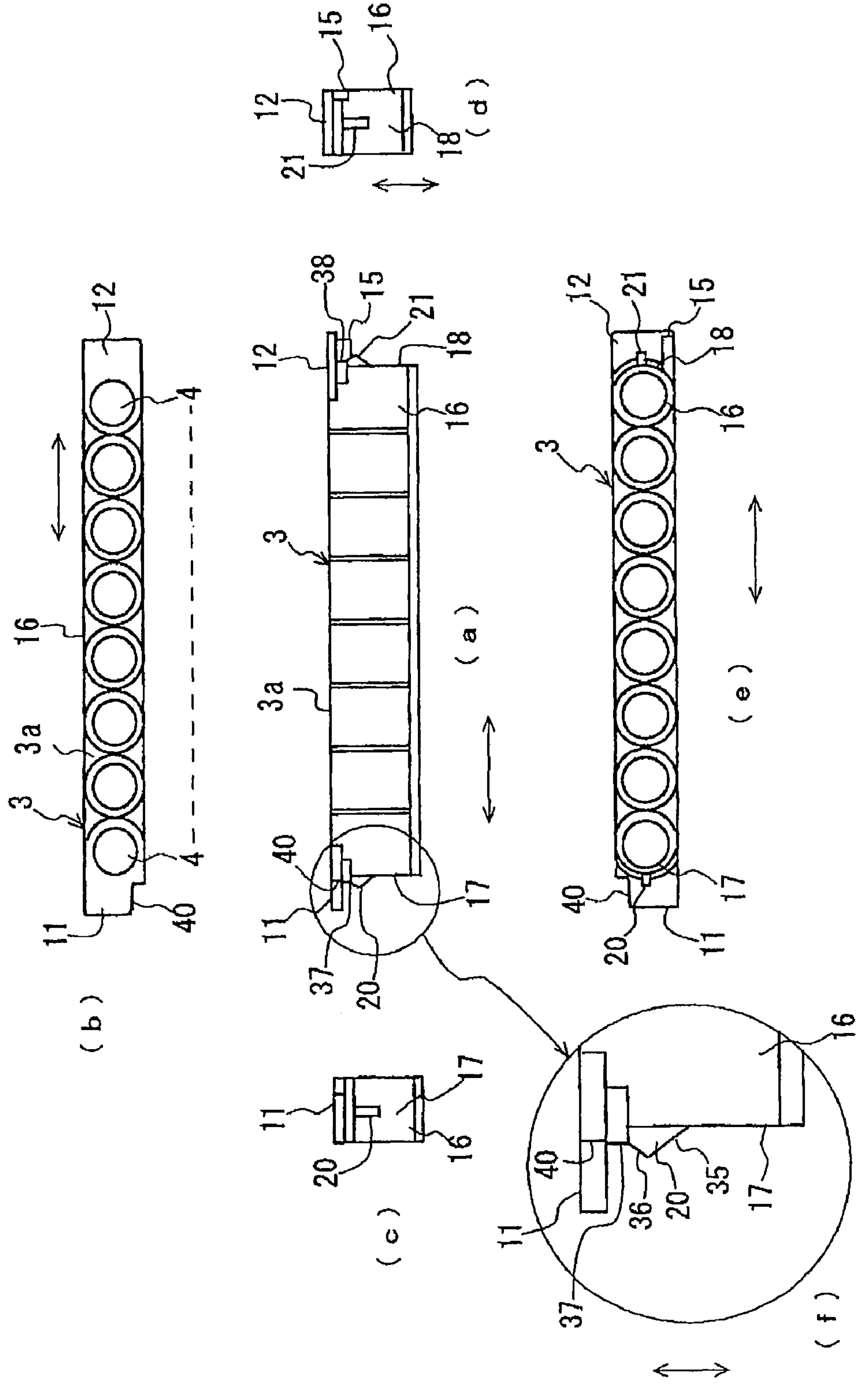
FIG. 6 are diagrams of a strip plate configuring the fluid handling device in FIG. 1.

As shown in FIG. 6, the strip plate 3 has an elongated, roughly rectangular planar shape (see FIG. 6B). The strip plate 3 includes the main body portion 16 on which a plurality (eight, according to the embodiment) of wells are aligned equal distance apart. The shoulder sections 11 and 12 are formed on both longitudinal direction end sides of the main body portion 16 on the upper surface 3*a* side (side on which the well 4 opens and the upper side in FIG. 6A). The well 4 formed on the strip plate 3 is a recess forming a roughly columnar space used to hold a specimen and the like. An opening section of the well 4 is circular. The main body portion 16 of the strip plate 3 is shaped such that eight cylindrical containers with a bottom, forming the wells 4, are connected in a row. The main body portion 16 is formed having dimensions that fit within the space 10 surrounded by the four side walls (first to fourth side walls) 5 to 8 when one shoulder section 11 is placed on the upper end section 5*c* of the first side wall 5 and the other shoulder section 12 is placed on the upper end section 6*c* of the second side wall 6 (when incorporated into the frame 2) (see FIG. 2).

As shown in FIG. 2 and FIG. 6, a projection 20 is formed on a longitudinal direction end section of the main body portion 16 of the strip plate 3 that is also a side surface 17 facing an inner side surface of the first side wall 5. A projection 21 is formed on a longitudinal direction end section of the main body portion 16 of the strip plate 3 that is also a side surface 18 facing an inner side surface of the second side wall 6. As shown in FIG. 6A and FIG. 6F, both projections 20 and 21 are formed having the same shape (however, in FIG. 6A, the projections 20 and 21 are horizontally symmetrical rough triangles). Both projections 20 and 21 have a first sloped surface 35 of which a projection height gradually increases from the bottom towards the top and a second sloped surface 36 of which the projection height gradually decreases from the upper end of the first sloped surface 35 further upwards. The shape of the projections 20 and 21 can be an arc of which the projection height gradually changes, such as a portion cut away from a disk.

As shown in FIG. 2, FIG. 6A, and FIG. 6F, a recess section 37 (concave-convex engaging section) is formed between one shoulder 11 of the strip plates 3 and the projection 20. The recess section 37 is recessed to a degree allowing storage of the eaves section 24 of the first side wall 5. A recess section 38 (concave-convex engaging section) is formed between the other shoulder 12 of the strip plate 3 and the projection 21. The recess section 38 is recessed to a degree allowing storage of the eaves section 25 of the second side wall 6. Here, bottom surfaces of the recess sections 37 and 38 (side surfaces of the main body portion 16) function to decide a maximum value of the degree of engagement (engagement amount) between the eaves section 24 and the projection 20, and between the eaves section 25 and the projection 21. In other words, as shown in FIG. 7A and FIG. 7*b*, the bottom surfaces of the recess sections 37 and 38 are surfaces facing the tips of the eaves sections 24 and 25 on the space 10 side when the strip plate 3 is incorporated into the frame 2. The bottom surfaces of the recess sections 37 and 38 can strike the tips of the eaves sections 24 and 25 on the space 10 side. As a result, a projection amount (a length in a direction along a longitudinal direction of the strip plate 3) δ of the tips of the projections 20 and 21 relative to the bottom surface of recess sections 37 and 38 serves as maximum overlap amount (degree of engagement) between the eaves section 24 and the projection 20 and between the eaves section 25 and the projection 21, when the strip plate 3 is incorporated at the predetermined positions on the frame 2. In this way, the maximum overlap amount between the eaves section 24 and the projection 20 and between the eaves section 25 and the projection 21 can be restricted. As a result, an external force applied to the strip plate 3 when the strip plate 3 is attached and detached from the frame 2 can be prevented from becoming too large. In FIG. 6A and FIG. 6F, the bottom surfaces of the recess sections 37 and 38 are smoothly connected to the second sloped surfaces 36 of the projections 20 and 21 without any level difference. As a result, when the strip plate 3 according to the embodiment is removed from the frame 2, the projection 20 and the eaves section 24 of the first side wall 5 smoothly slide and the eaves section 24 can be smoothly removed from the recess section 37. The projection 21 and the eaves section 25 of the second side wall 6 smoothly slide and the eaves section 25 can be smoothly removed from the recess section 38.

As shown in FIG. 2 and FIG. 6, a notched section 40 is formed on one shoulder 11 of the strip plate 3. The notched, section 40 engages with the positioning projection 13 formed on the upper end section 5*c* of the first side wall 5. The one shoulder 11 of the strip plate 3 is formed such that a width dimension (a length in a direction perpendicular to the longitudinal direction of the strip plate 3 in FIG. 6B) is slightly shorter than the distance between adjacent positioning projections 13 and 13.

The positioning projections 15 are formed on the lower surface side of the other shoulder section 12 of the strip plate 3 projecting downward. The positioning projection 15 engages with the positioning recess 14 formed on the upper end section 6*c* of the second side wall 6. Another specific example of a configuration of the strip plate 3 is described hereafter.

(Assembly of Fluid Handling Device)

When the strip plate 3 is incorporated into the frame at a predetermined position, an assembly operation taking into consideration the configuration of the frame 2 is performed. In other words, the first side wall 5 of the frame 2 is formed connected to the third side wall 7 and the fourth side wall 8. The second side wall 6 of the frame 2 has the slits 30 and 31 in the corner sections 27 and 28 between the second side wall 6 and the third side wall 7 and between the second side wall 6 and the fourth side wall 8 (see FIG. 3 and FIG. 4). Therefore, predetermined areas from the upper end side 6*c* towards the lower end side 6*d* of the second side wall 5 of the frame 2 are separated from the third side wall 7 and the fourth side wall 8. The predetermined areas on the upper end section 6*c* are more easily deformed than the first side wall 5. Therefore, when the strip plate 3 is attached to the frame 2, the assembly operation is performed through deformation of the second side wall 6 side.

First, as shown in FIG. 7C and FIG. 7D, the one shoulder 11 of the strip plate 3 is placed on the upper end section 5*c* of the first side wall 5 at a predetermined alignment position. The positioning projection 13 positions the one shoulder 11 of the strip plate 3 so that the shoulder 11 does not shift and move. The eaves section 24 on the first side wall 5 side is engaged with the recess 37 between the one shoulder 11 of the strip plate 3 and the projection 20. The strip plate 3 is rotated with a contacting portion between the first side wall 5 and the strip plate 3 serving as a fulcrum. The positioning projection 15 of the strip plate 3 is engaged with the positioning recess 14 of the second side wall 6. The other shoulder 12 side of the strip plate 3 is pressed downward towards the upper end section 6*c* of the second side wall 6. At this time, the first sloped surface 35 of the projection 21 positioned on the other shoulder 12 side of the strip plate 3 comes into contact with the eaves section 25 of the second side wall 6. The projection 21 gradually deforms the second side wall 6 outwards (right-hand side in FIG. 7D) depending on the slope angle of the first sloped surface 35. After the tip (peak section) of the projection 21 passes over the eaves section 25 and the other shoulder 21 of the strip plate 3 is pushed further downwards, the second side wall 6 presses the eaves section 25 to the second sloped surface 36 of the projection 21 using elastic force. The eaves section 25 of the second side wall 6 is guided towards the recess 38 between the shoulder 12 and the projection 21 along the second sloped surface 36 of the projection 21. The eaves section 25 of the second side wall 6 engages with the recess 38 between the shoulder 12 and the projection 21 (see FIG. 7A and FIG. 7*b*). As a result, the strip plate 3 is held by the frame as positioned. In this way, the strip plates 3 in the first to twelfth rows are attached to the frame 2, and the assembly operation of the fluid handling device 1 is completed.

(Separation of the Strip Plate from the Frame)

The strip plate 3 attached to the frame 2 at the predetermined position rotates with the contacting portion between the projection 20 on the first side wall 5 side and the eaves section 24 of the first side wall 5 serving as the fulcrum when an external force is applied in a direction in which the shoulder section 12 separates from the frame 2. The second sloped surface 36 of the projection 21 on the second side wall 6 side comes into contact with the eaves section 25 of the second side wall 6. The projection 21 gradually deforms the second side wall 6 outwards depending on the slope angle of the second sloped surface 36 (see FIG. 7A to FIG. 7D). After the tip of the projection 21 passes over the eaves section 25 and the other shoulder 12 of the strip plate 3 is pressed upwards, the second side wall 6 presses the eaves section 25 to the first sloped surface 35 of the projection 21 using the elastic force. The eaves section 25 of the second side wall 6 gradually returns to its original position (before deformation) along the first sloped surface 35 of the projection 21. The engagement between the recess 38, provided between the shoulder 12 of the strip plate 3 and the projection 21, and the eaves section 25 of the second side wall 6 is released. Moreover, when the strip plate 3 is pressed upwards by the external force (when pressed in a direction away from the frame 2), the engagement between the recess 37, provided between the shoulder section 11 of the strip plate 11 and the projection 20, and the eaves section 24 of the first side wall 5 is also released. As a result, the strip plate 3 is separated from the frame 2.

EFFECTS OF THE EMBODIMENT

According to the embodiment, when the strip plate 3 is incorporated into the frame 2, engagement and disengagement can be performed by an operation in which the projection 21 of the strip plate 3 deforms the second side wall 6 of the frame 2, and the strip plate 3 is inserted into the frame 2 or the strip plate 3 is pushed out of the frame 2. Therefore, a separate component is not required to prevent detachment of the strip plate 3 incorporated into the frame 2.

According to the embodiment, as long as the second side wall 6 of the frame 2 is not deformed through application of the external force on the strip plate 3, the strip plate 3 is not disengaged from the frame 2. Therefore, the strip plate 3 does not easily detach from the frame 2 during manual operations such as transportation.

According to the embodiment, one side wall of the pair of side walls (the first side wall 5 and the second side wall 6) engaging with the strip plate 3 through concave and convex sections is the second side wall 6. As a result of an effect of the slits 30 and 31 provided on both corner sections 27 and 28 between the second side wall 6 and the third side wall 7 and between the second side wall 6 and the fourth side wall 8, the vicinity of the formation position of the eaves section 25 serving as the locking section in particular becomes easily deformed compared to the second side wall 6 near the corner sections when the slits are not provided. Therefore, the external force applied to the strip plate 3 when the strip plate 3 is attached to and detached from the frame 2 can be reduced. The attachment and detachment operations of the strip plate 3 and the frame 2 can be performed smoothly. As a result, according to the embodiment, when the strip plate 3 storing the specimen and the like within the wells 4 is attached to or detached from the frame 2, the specimen and the like within the wells 4 can be effectively prevented from spilling as a result of impact when the strip plate 3 is attached to and detached from the frame 2.

According to the embodiment, the strip plate 3 can be held by the frame 2 in the positioned state. Therefore, the invention can be applied to when the strip plate 3 is attached to only a predetermined row on the frame 2 and used.

Second Embodiment

Figure 8:
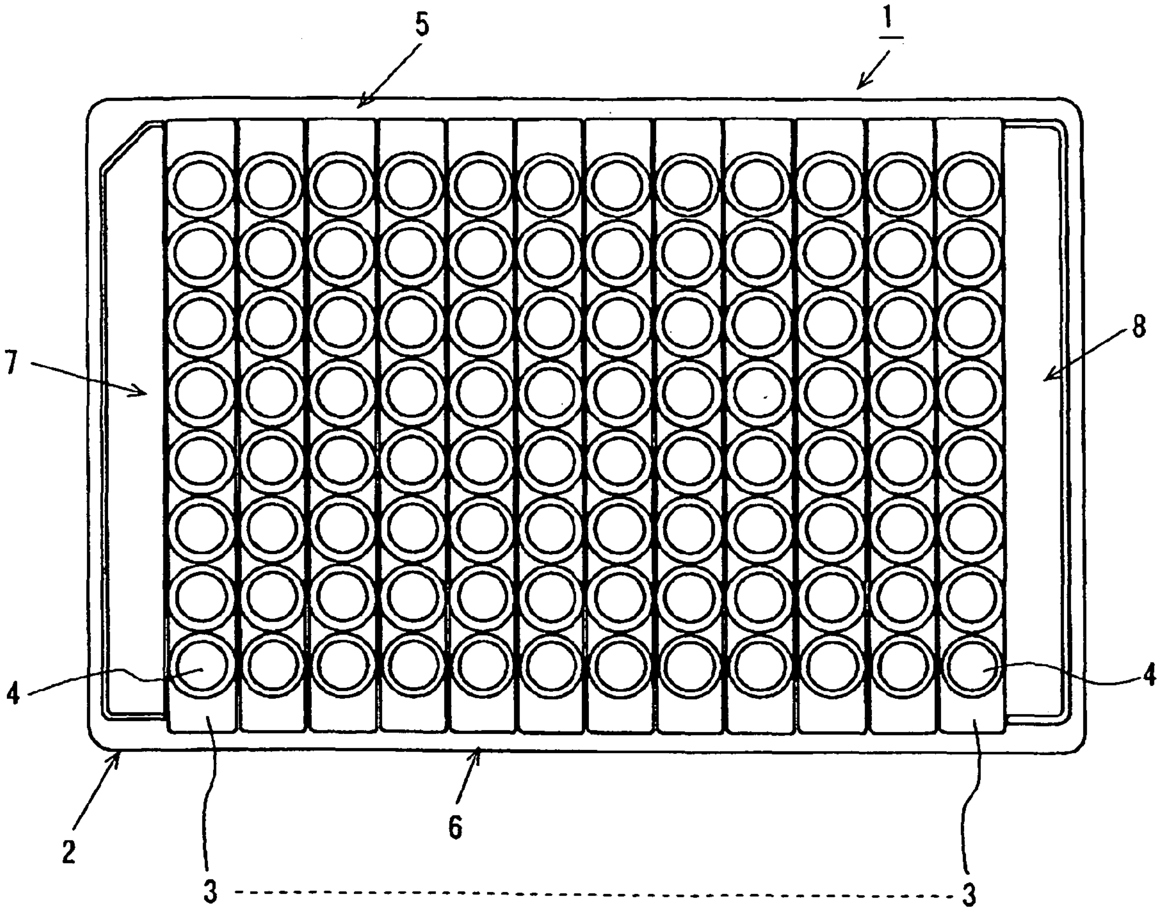
FIG. 8 is a planar view of a fluid handling device according to a second embodiment of the present invention.
Figure 9:
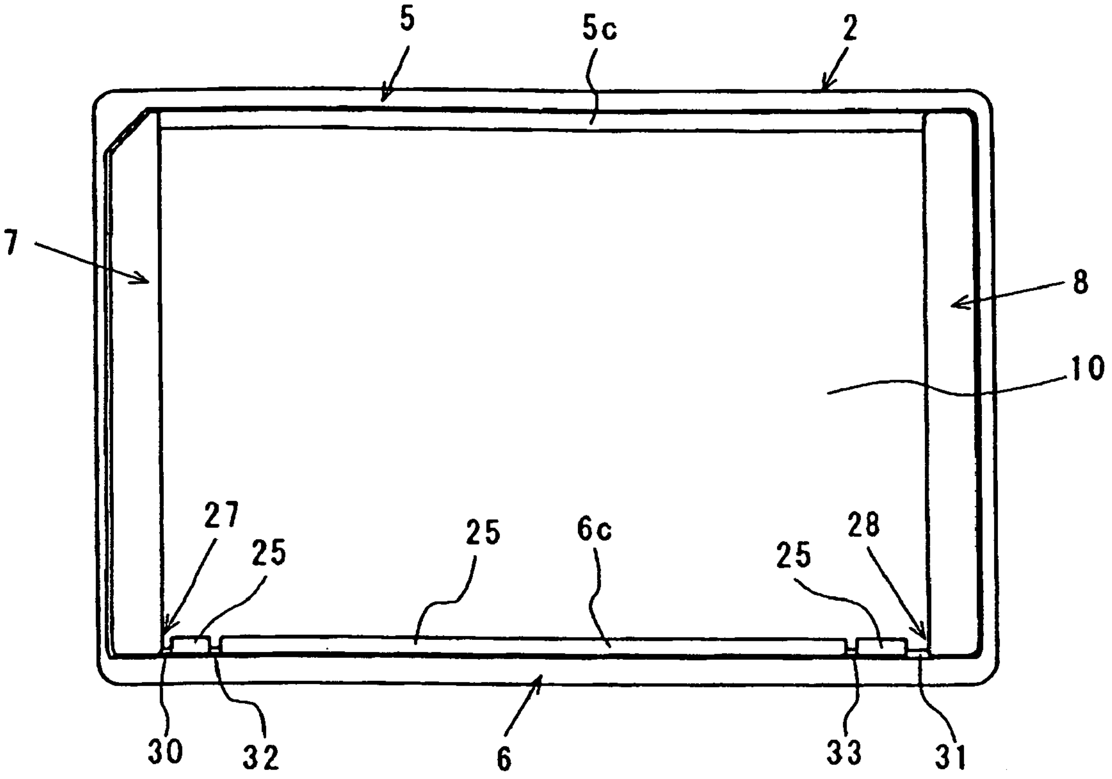
FIG. 9A is a planar view of a frame configuring the fluid handling device in FIG. 8.
FIG. 9B is a side view of the frame viewed from a second side wall side.
FIG. 9C is a side view of the frame viewed from a first side wall side.
Figure 9:
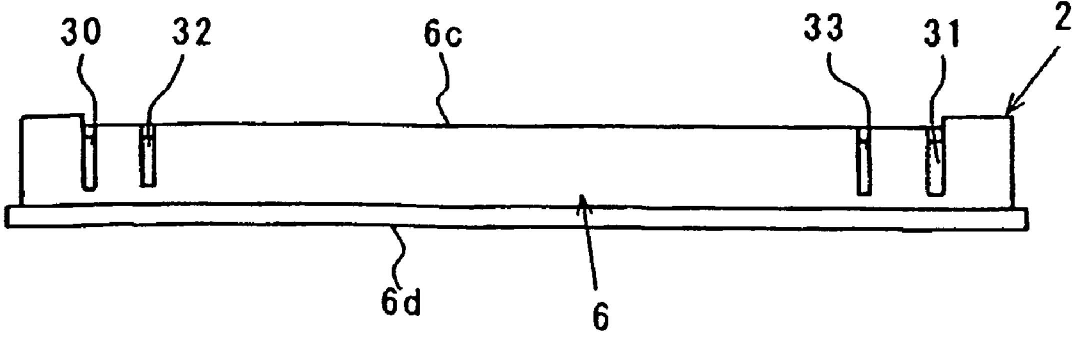
Figure 9:
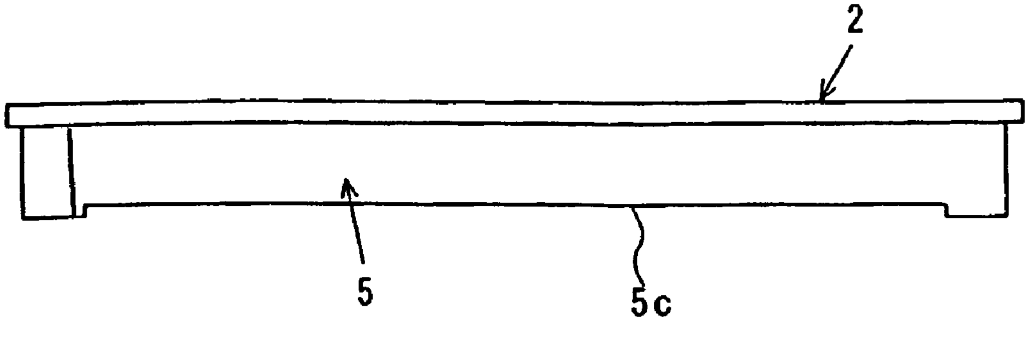
Figure 10:
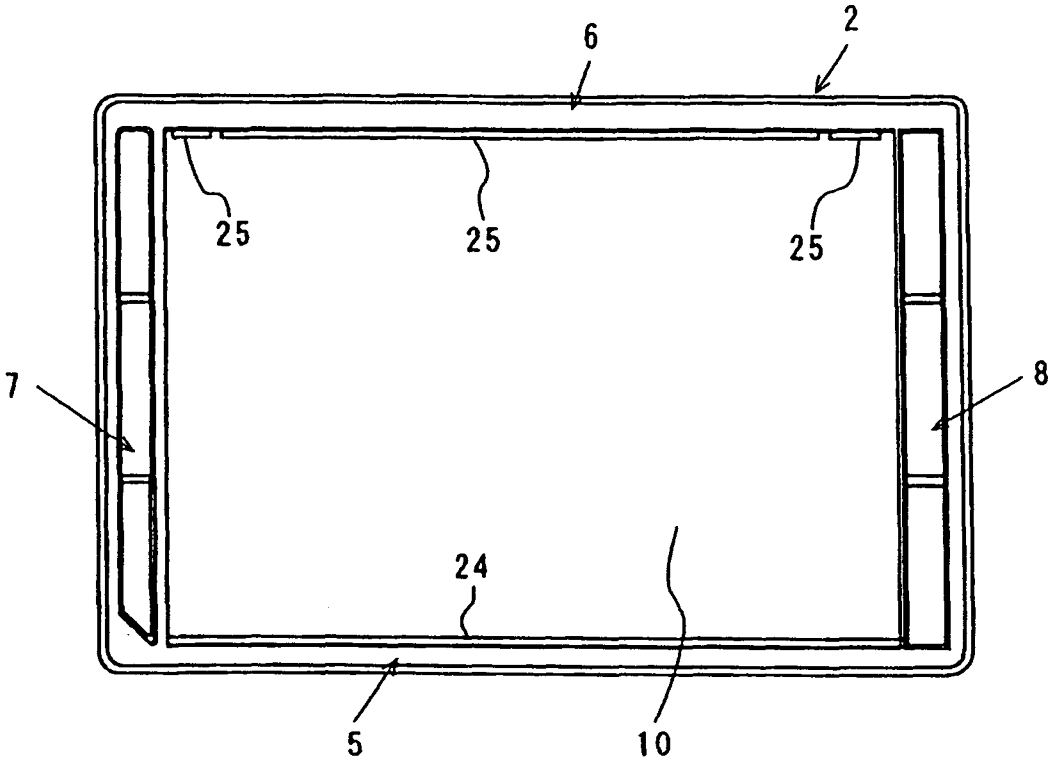
FIG. 10 is a rear view of the frame configuring the fluid handling device in FIG. 8.

FIG. 8 to FIG. 10 show a second embodiment of the present invention. FIG. 8 is a planar view of the fluid handing device 1 according to the embodiment. FIG. 9 is a diagram of the frame 2 according to the embodiment, corresponding to FIG. 4 according to the first embodiment. FIG. 10 is a rear view of the frame according to the embodiment, corresponding to FIG. 5 according to the first embodiment.

According to the embodiment, the fluid handling device 1 is described in which the procedure for positioning the strip plate 3 on the frame 2 according to the first embodiment is omitted. In other words, according to the embodiment, the notched section 40 of the shoulder 11 of the strip plate 3 and the positioning projection 15 according to the first embodiment are omitted. Moreover, the positioning projection 13 of the second side wall 6 and the positioning recess 14 according to the first embodiment are omitted. According to the embodiment, the eaves sections 25 on the upper end section 6*c* of the second side wall 6 are formed such that the amount of projection towards the space 10 side is even along the array direction of the strip plates 3.

However, according to the embodiment, aside from the differences with the first embodiment, a basic configuration is the same as that according to the first embodiment. The pair of slits 30 and 31 and the pair of sub-slits 32 and 33 are formed on the second side wall 6.

According to the embodiment, the invention can be applied when the 12 strip plates 3 corresponding to all rows from the first to twelfth rows are sequentially incorporated into the frame 2. Alternatively, the invention can be applied when only the strip plate 3 of the first or twelfth row or the strip plates 3 of both the first and twelfth rows is incorporated into the frame 2. The same effects as those according to the first embodiment can be achieved.

When the strip plate 3 is incorporated into an arbitrary row of the frame 2, a positioning means for the strip plate 3 and the frame 2 is required as according to the first embodiment.

Third Embodiment

Figure 11:
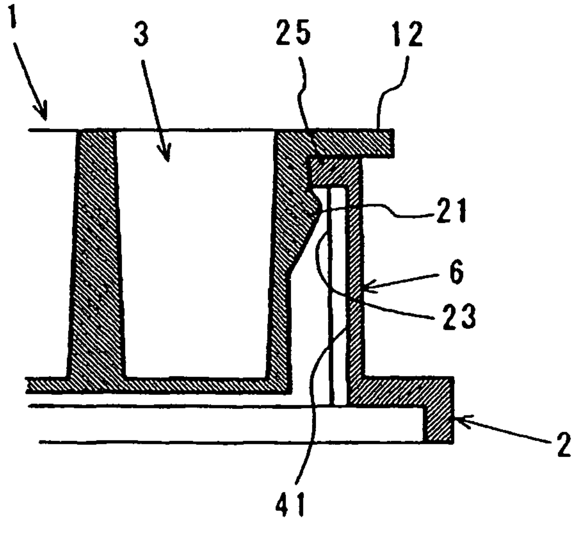
FIG. 11 is a diagram for explaining a fluid handling device according to a third embodiment of the present invention and is a partially enlarged, partial cross-sectional view of the fluid handling device.

FIG. 11 shows a third embodiment of the present invention. In place of the slits 30 and 31 according to the first embodiment and the second embodiment, in predetermined areas of the second side wall 6 near the connecting point between the second wall 6 and the third wall 7, the corner section 27 between the second wall 6 and the third wall 7, and the corner section 28 between the second wall 6 and the fourth wall 8, a thin-walled section 41 is formed in a predetermined area from the upper end section side (bottom surface of the eaves section 25) towards the lower end section side. The thin-walled section 41 is thinner than other portions of the second side wall 6. The second side wall 6, particularly the vicinity of the formation position of the eaves section 25 serving as the locking section, becomes easily deformed when the strip plate 3 is attached to and detached from the frame 2, compared to when the thin-walled section 41 is not provided. According to the embodiment, the same effects as those according to the first embodiment and the second embodiment can be achieved.

Other Embodiments

The present invention is not limited to those according to the first and second embodiments in which the pair of slits 30 and 31 and the pair of sub-slits 32 and 33 are formed on the second side wall 6 of the frame 2. A pair of slits and a pair of sub-slits can be formed on the first side wall 5 of the frame 2 in correspondence with the second side wall 6.

The present invention is not limited to those according to the first and second embodiments in which the pair of slits 30 and 31 and the pair of sub-slits 32 and 33 are formed on the second side wall 6 of the frame 2. The pair of slits 30 and 31 and the pair of sub-slits 32 and 33 can be formed on only the first side wall 5 of the frame 2.

The present invention is not limited to those according to the first and second embodiments. Only the pair of slits 30 and 31 can be formed on either the second side wall 6 or the first side wall 5, or on both side walls of the frame 2.

The present invention is not limited to when the pair of slits 30 and 31 are formed on either the second side wall 6 or the first side wall 5, or on both side walls of the frame 2. A slit can be formed on either a corner section between the third side wall 7 and the second side wall 6 or a corner section between the third side wall 7 and the first side wall 5, or on both corner sections, at a position on the third side wall 7 side. Either the upper end section 6*c* side of the second side wall 6 or the upper end section 5*c* side of the first side wall 5, or both side walls can be partially cut away from the third side wall 7.

The present invention is not limited to when the pair of slits 30 and 31 are formed on either the second side wall 6 or the first side wall 5, or on both side walls of the frame 2. A slit can be formed on either a corner section between the fourth side wall 8 and the second side wall 6 or a corner section between the fourth side wall 8 and the first side wall 5, or on both corner sections, at a position on the fourth side wall 8 side. Either the upper end section 6*c* side of the second side wall 6 or the upper end section 5c side of the first side wall 5, or both side walls can be partially cut away from the fourth side wall 8.

The present invention is not limited to those according to the first and second embodiments. The sub-slits 32 and 33 can be formed accordingly in areas of either the second side wall 6 or the first side wall 5 or of both side walls as required.

The strip plate 3 used in the fluid handling device of the present invention is not limited to the strip plate 3 having the configuration used according to the first embodiment and the second embodiment. For example, a strip plate 3 configured as described below can also be used.

Other Configurations of the Strip Plate

First Specific Example

Figure 12:
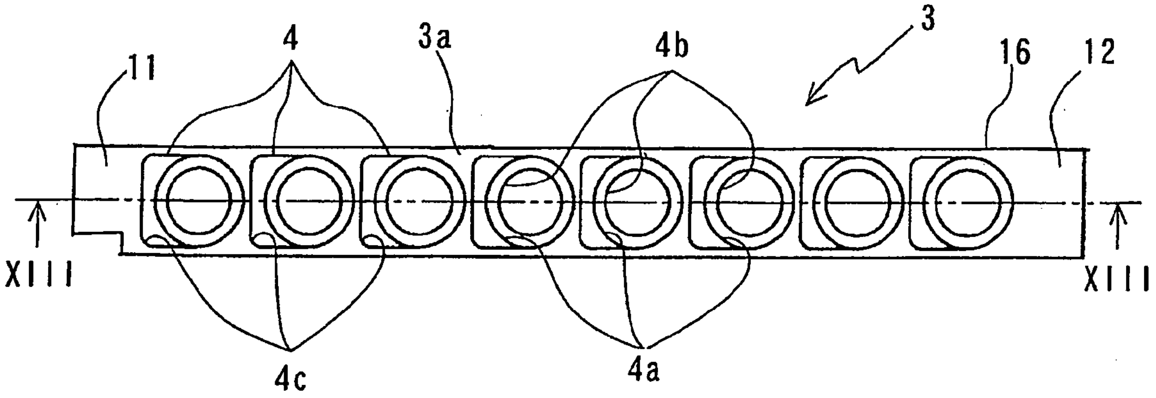
FIG. 12 is an enlarged, planar view of a first specific example of another configuration of the strip plate used in the fluid handling device of the present invention.
Figure 13:
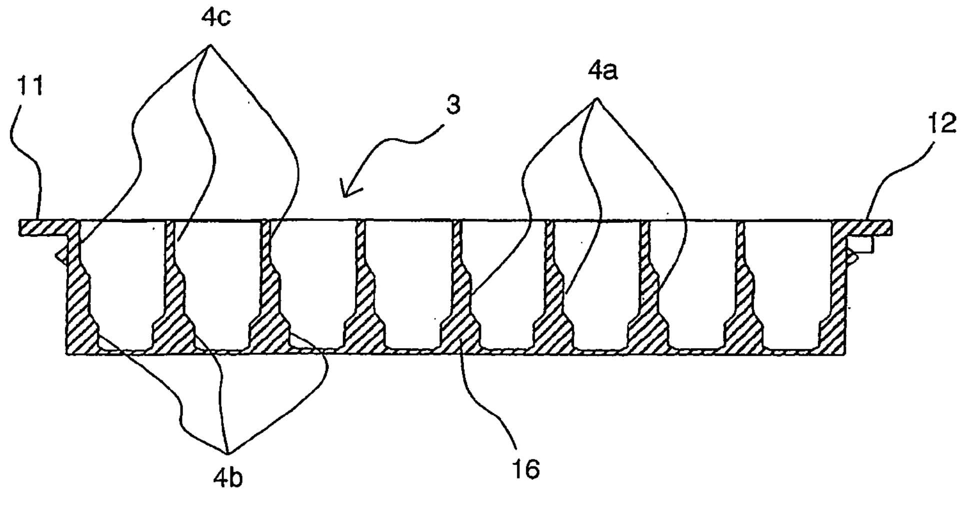
FIG. 13 is a cross-sectional view taken along line XIII-XIII in FIG. 12.
Figure 14:
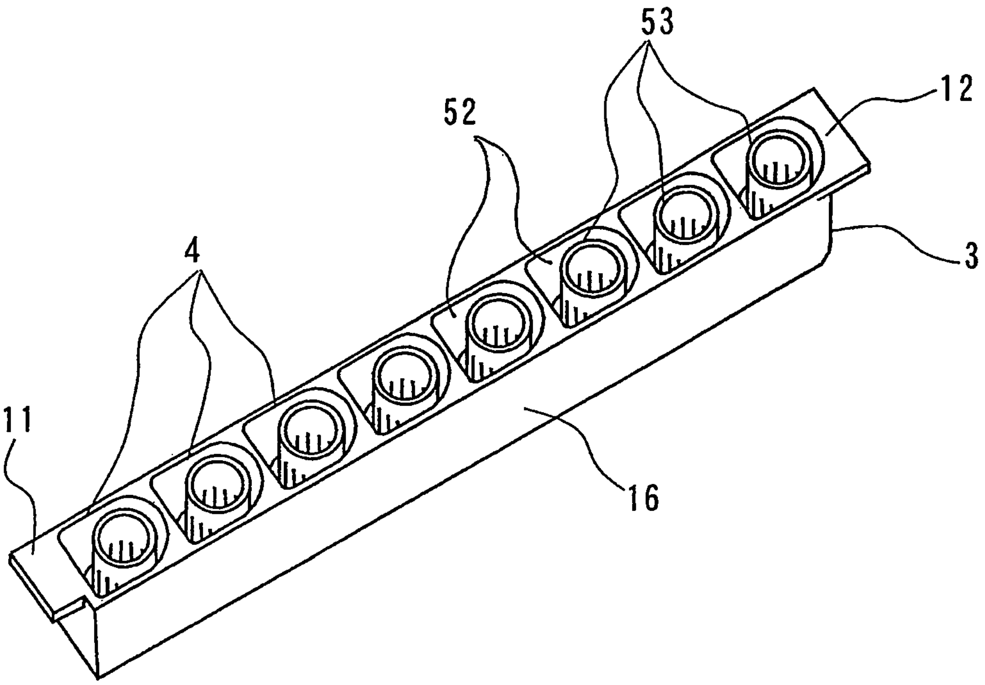
FIG. 14 is a perspective view of the strip plate of the first specific example in FIG. 12 when in use.

In the strip plate 3 shown in FIG. 12 and FIG. 13, a plurality of wells 4 (eight, according to the embodiment) (referred to, hereinafter, as "attachment wells 4)" are formed on the upper surface 3a of the main body portion 16, a predetermined distance apart. A fluid handling section 52 is formed within the attachment wells 4 as shown in FIG. 14. As shown in FIG. 12 and FIG. 13, each attachment well 4 includes a roughly cylindrical large diameter well 4a, an expanded well 4c, and a roughly cylindrical small diameter well 4b. The large diameter well 4a is formed on the upper surface 3a of the main body portion 16. The expanded well 4c is formed adjacent to the large diameter well 4a, on the upper surface 3a of the main body portion 16 such as to expand an upper side portion of the large diameter well 4a in a roughly horizontal direction. The expanded well 4c is about half as deep as the large diameter well 4a. The small diameter well 4b is formed in a roughly center section of a bottom surface of the large diameter well 4a. Two opposing surfaces of the expanded well 4 extending from the large diameter well 4a extend roughly in parallel, along a side surface of the strip plate 3 extending in the longitudinal direction of the main body portion 16 (see FIG. 15). A bottom surface of the extended well 4c is tilted downwards, curving towards the large diameter well 4a. The bottom surface of the large diameter well 4a is tilted downwards, curving towards the small diameter well 4b (see FIG. 16). A miniscule well 4d is formed on a bottom surface of the small diameter well 4b. The miniscule well 4d has roughly the same diameter as an inner diameter of a cylindrical component 53, described hereafter, and has little depth. A space is formed to prevent interference between a bottom surface of the cylindrical component 53 and the bottom surface of the attachment well 4, when the cylindrical component 53 is engaged within the small diameter well 4b.

Figure 15:
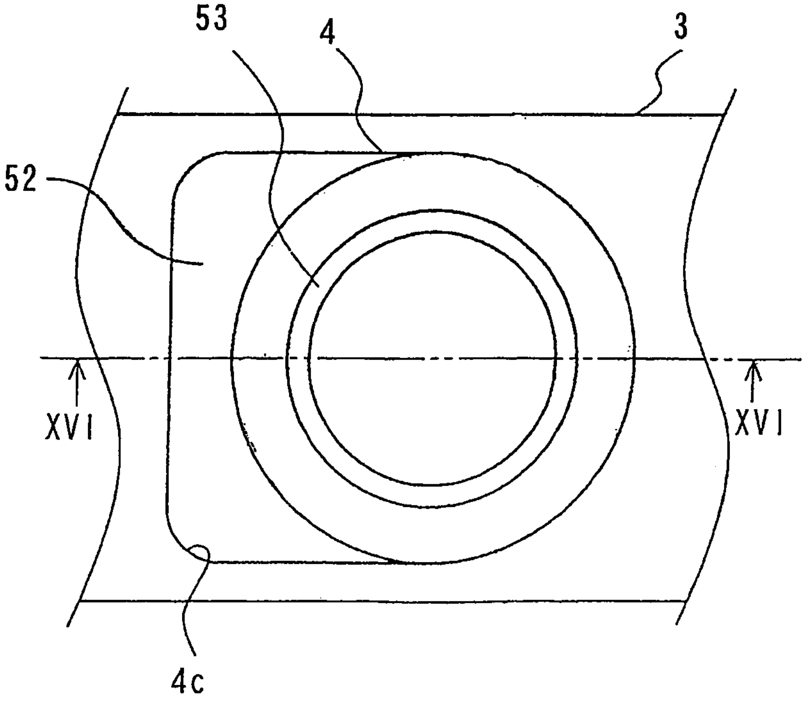
FIG. 15 is a planar view of a fluid handling section of the strip plate of the first specific example in FIG. 12.
Figure 16:
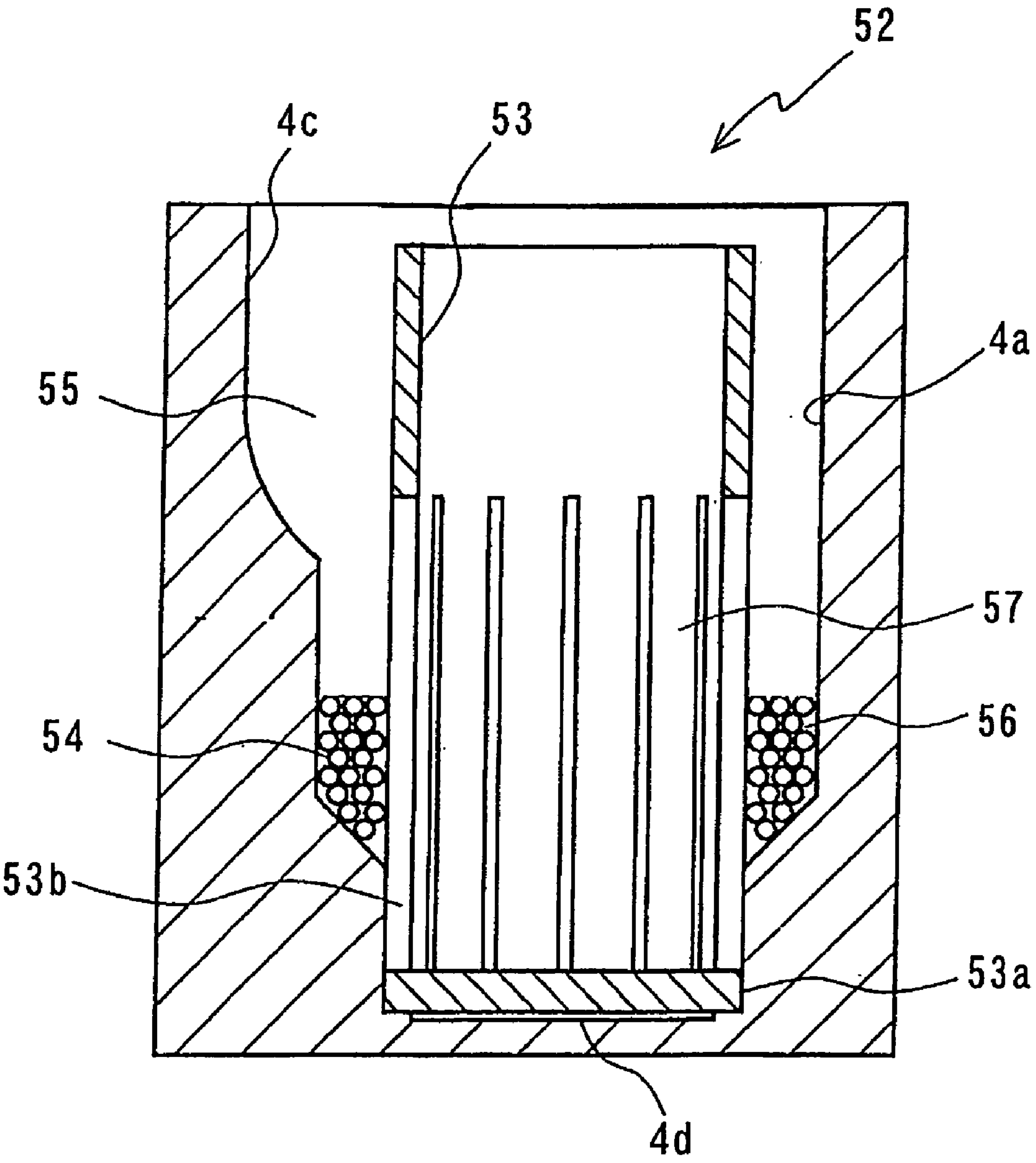
FIG. 16 is a cross-sectional view taken along line XVI-XVI in FIG. 15.
Figure 17:
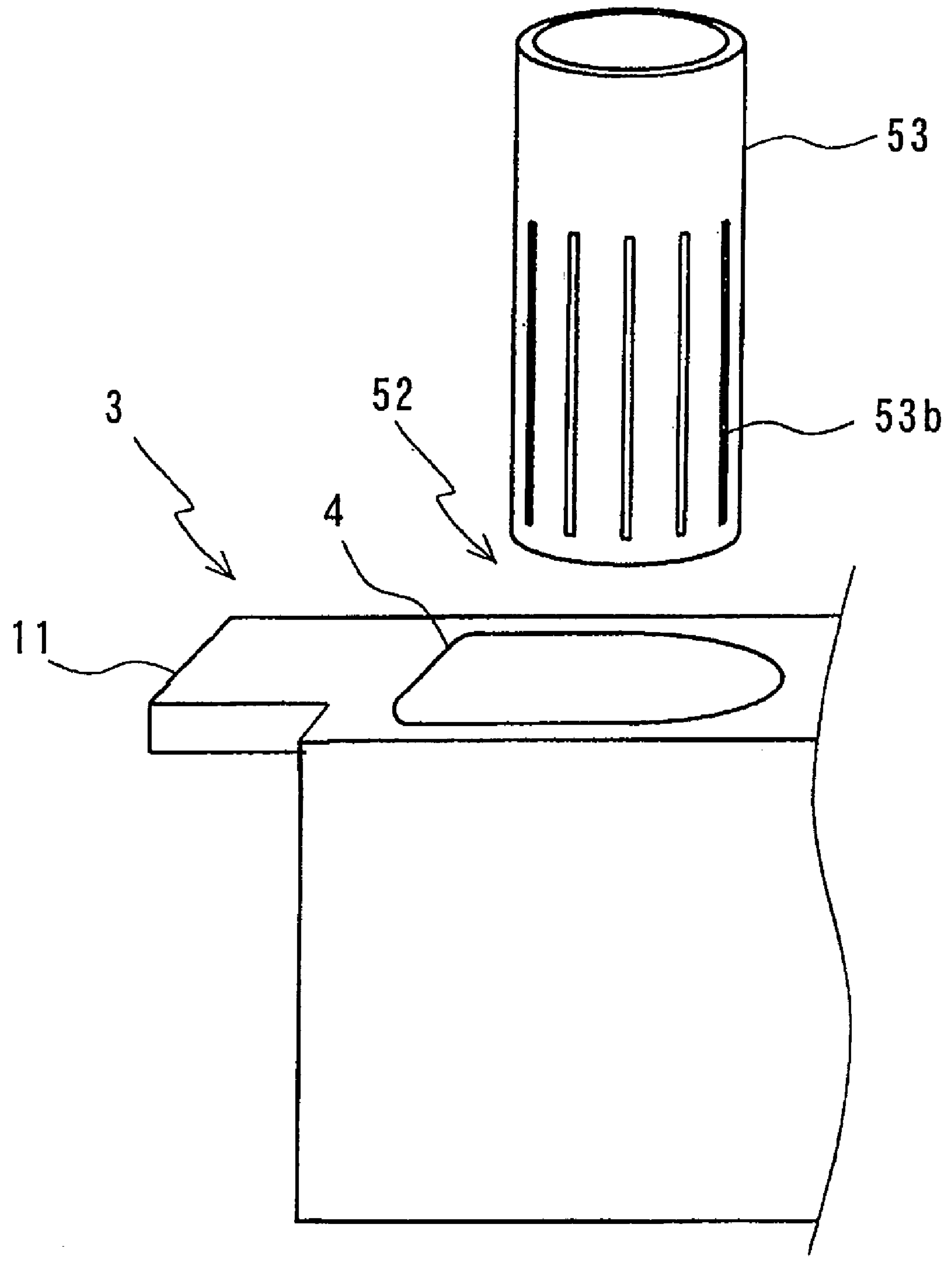
FIG. 17 is an exploded perspective view of the strip plate of the first specific example in FIG. 12, from which beads in the fluid handling section are omitted.
Figure 18:
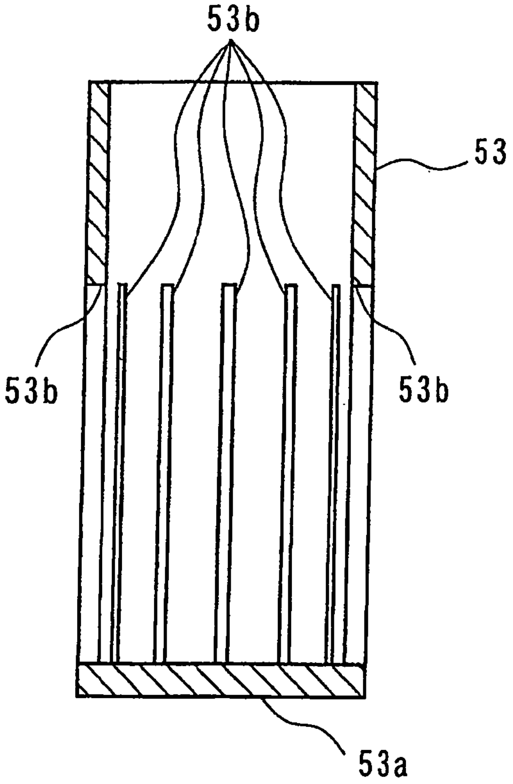
FIG. 18 is a cross-sectional view of a cylindrical component of the fluid handling section in the strip plate of the first specific example in FIG. 12.
Figure 19:
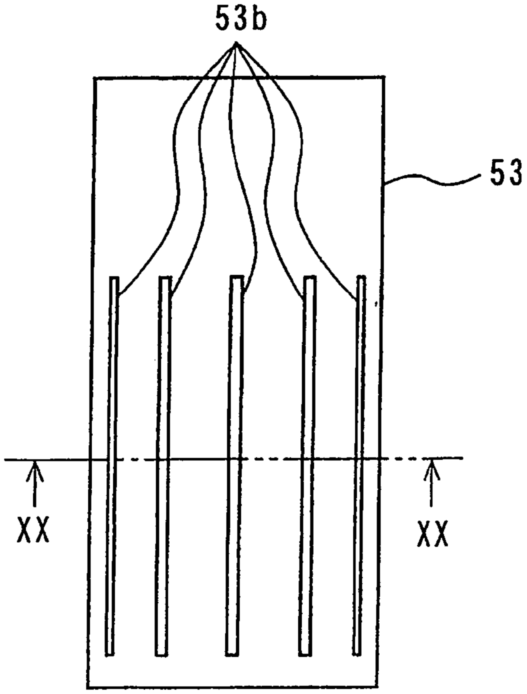
FIG. 19 is a side view of the cylindrical component in FIG. 18.
Figure 20:
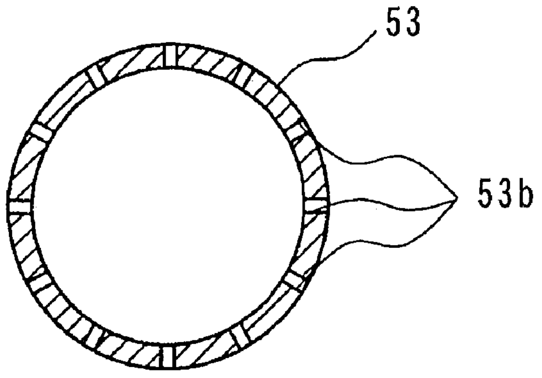
FIG. 20 is a cross-sectional view taken along line XX-XX in FIG. 19.
Figure 21:
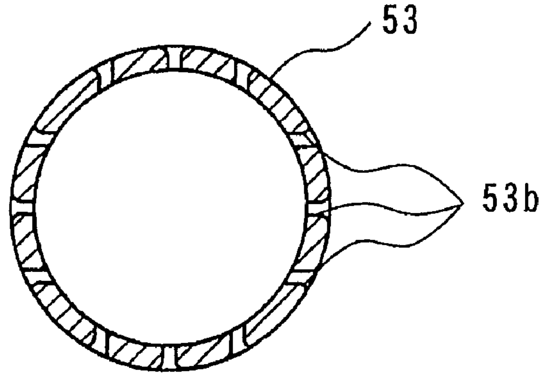
FIG. 21 is a cross-sectional view of a variation example of the cylindrical component in FIG. 18.

FIG. 15 to FIG. 17 are enlarged views of the fluid handling section 52 attached within each attachment well 4 of a fluid handling device 10 according to the embodiment. FIG. 15 is a planar view of the fluid handling section 52 when beads 54 are removed from each attachment well 4 of the fluid handling device 10. FIG. 16 is a cross-sectional view taken along line XVI-XVI when the fluid handling section 52 is filled with beads. FIG. 17 is an exploded perspective view of the fluid handling section 52 (without the beads 54). FIG. 18 is a cross-sectional view of the cylindrical component 53 of the fluid handling section 52 in FIG. 16. FIG. 19 is a side view of the cylindrical component 53 in FIG. 18. FIG. 20 is a cross-sectional view taken along line XX-XX in FIG. 19. FIG. 21 is a cross-sectional view of a variation example of the cylindrical component 53 in FIG. 18.

As shown in FIG. 15 to FIG. 17, each fluid handing section 52 includes the roughly cylinder-shaped, cylindrical component 53 and a large number of fine, roughly spherical beads 54. The cylindrical component 53 has a diameter and a height of several millimeters.

As shown in FIG. 16, the cylindrical component 53 has a length that is roughly the same as the depth (depths of the large diameter well 4a and the small diameter well 4b) of the attachment well 4. An outer diameter of the cylindrical component 53 is roughly the same as the inner diameter of the small diameter well 4b of the attachment well 4. A bottom section of the cylindrical component 53 is pressed into the small diameter well 4b of the attachment well 4. In the specific example, the expanded well 4c is provided. Therefore, even when the inner diameter of the small diameter well 4b and the outer diameter of the cylindrical component 53 is increased and distance between the cylindrical component 53 and the large diameter well 4a is shortened, an opening (inlet) of an injection section 55, described hereafter, of a sufficient size can be ensured. An inner diameter of the cylindrical component 53 can be, for example, about 4.5 millimeters. The cylindrical component 53 has a bottom surface section 53a. As shown in FIGS. 18 and 19, one or a plurality (12 slits in the specific example) of slits 53b is formed on an outer circumferential surface of the cylindrical component 53, extending in parallel from an upper surface of the bottom surface section 53a along the longitudinal direction. The slit 53b passes through the cylindrical component 53. The slit 53b has a width that allows a fluid to pass but not the beads 54. The slit 53b has a length that is half or more of the length of the cylindrical component 53. When the fluid handling section 52 is attached to the attachment well 4, an upper end of the slit 53b is disposed above a layer of beads 54 filling a ring-shaped space. In the specific example, the slits 53b are radially formed on the outer circumferential surface of the cylindrical component 53, as shown in FIG. 20. However, the slits 53b can pass through the outer circumferential surface of the cylindrical component 53 in four directions, as shown in FIG. 21, taking moldability into consideration.

When the fluid handling section 52 configured as described above is formed, a lower side portion of the cylindrical component 53 is fitted into the small diameter well 4b of the attachment well 4 and fixed by an adhesive or the like. The ring-shaped space between the large diameter well 5a of the attachment well 4 and the cylindrical component 53 is filled with the large number of beads 54.

When the fluid handling section 52 is formed in the attachment well 4 in this way, a space serving as the injection section 55 is formed between the cylindrical component 53 and the large diameter well 4a of the attachment well 4 and between the cylindrical component 53 and the expanded well 4c. The injection section 55 is used to inject a fluid, such as a liquid sample. The injection section 55 serves as an inlet. A flowing section 56 is formed between the large diameter well 4a of the attachment well 4 and the cylindrical component 53 on a lower section of the injection section 55. The flowing section 56 is a roughly ring-shaped space that can be used as a reaction section filled with the large number of beads 54. A fluid storage chamber 57 is formed within the cylindrical component 53. The fluid storage chamber 57 is a roughly cylindrical space that can be used as a measurement section. The fluid storage chamber 57 formed in this way is connected to the injection section 55 and the flowing section 56, via the slits 53b.

In this way, in the fluid handling section 52 of the specific example, an interior of the attachment well 4 of a size corresponding to each well of a micro-well plate is divided into the flowing section 56 that can be used as the reaction section and the fluid storage chamber 57 that can be used as the measurement section by the cylindrical component 53 extending in a roughly vertical direction. Fluid, such as a reagent, injected from the inlet can continuously flow within the flowing section 56 by capillary action, even in small amounts, without requiring external power. When the fluid storage chamber 57 formed within the cylindrical component 53 is used as the measurement section, the fluid from the flowing section 56 is introduced into the fluid storage chamber 57 having a smaller diameter than the large diameter well 4*a* of the attachment well 4 and corresponding to the well. Liquid level can be raised. Therefore, an amount of reagent to be used can be reduced and cost can be reduced.

Second Specific Example

Figure 22:
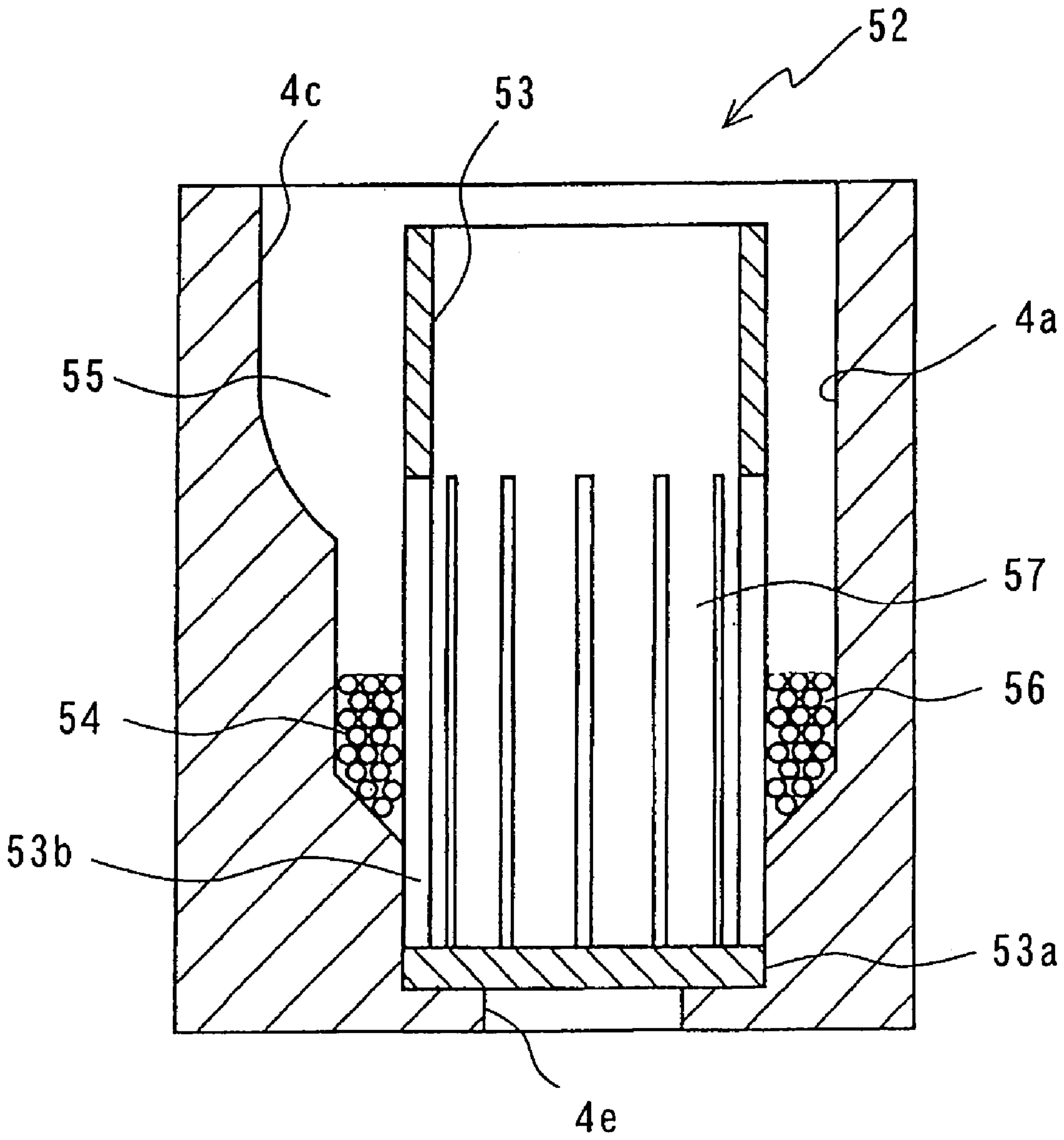
FIG. 22 is a cross-sectional view of a fluid handling section in a second specific example of another configuration of the strip plate used in the fluid handling device of the present invention.
Figure 23:
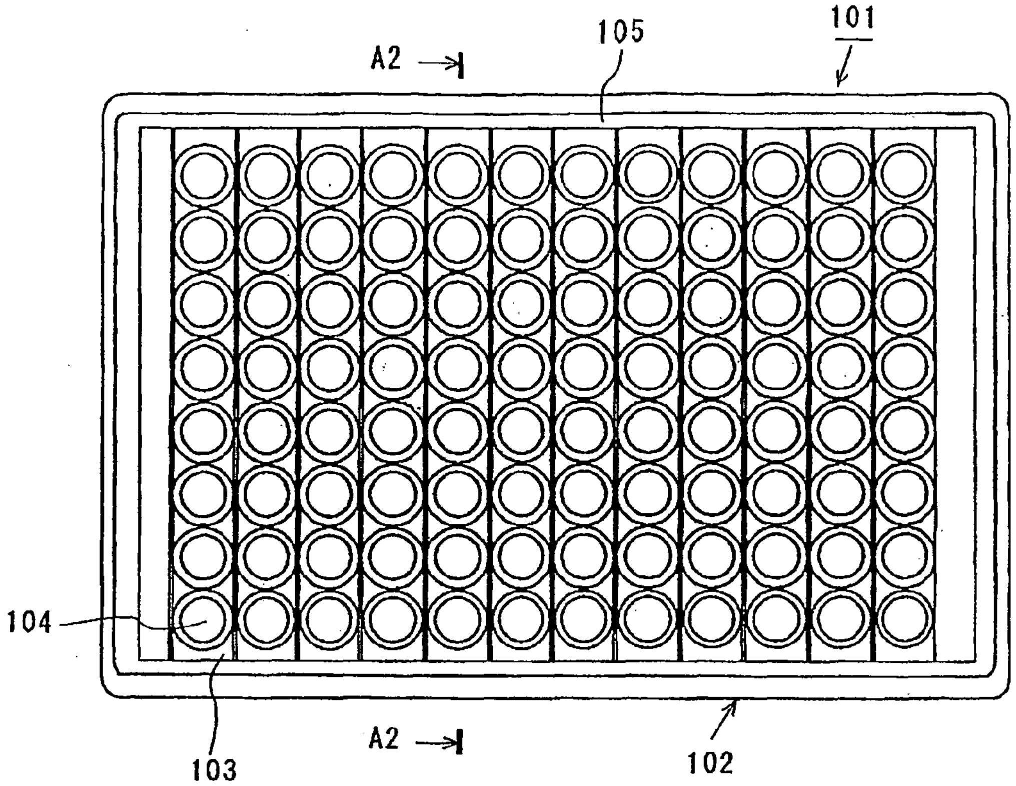
FIG.23 PRIOR ART
FIG. 23 is a planar view of a microplate of a first conventional example.
Figure 24:
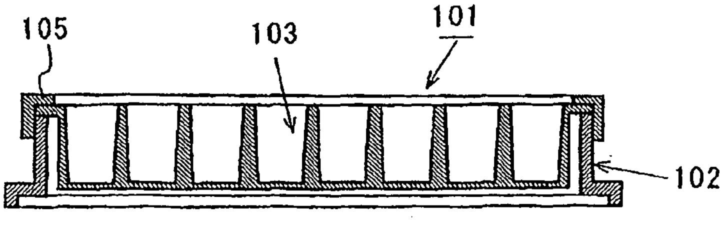
FIG.24 PRIOR ART
FIG. 24 is a cross-sectional view taken along line A2-A2 in FIG. 23.
Figure 25:
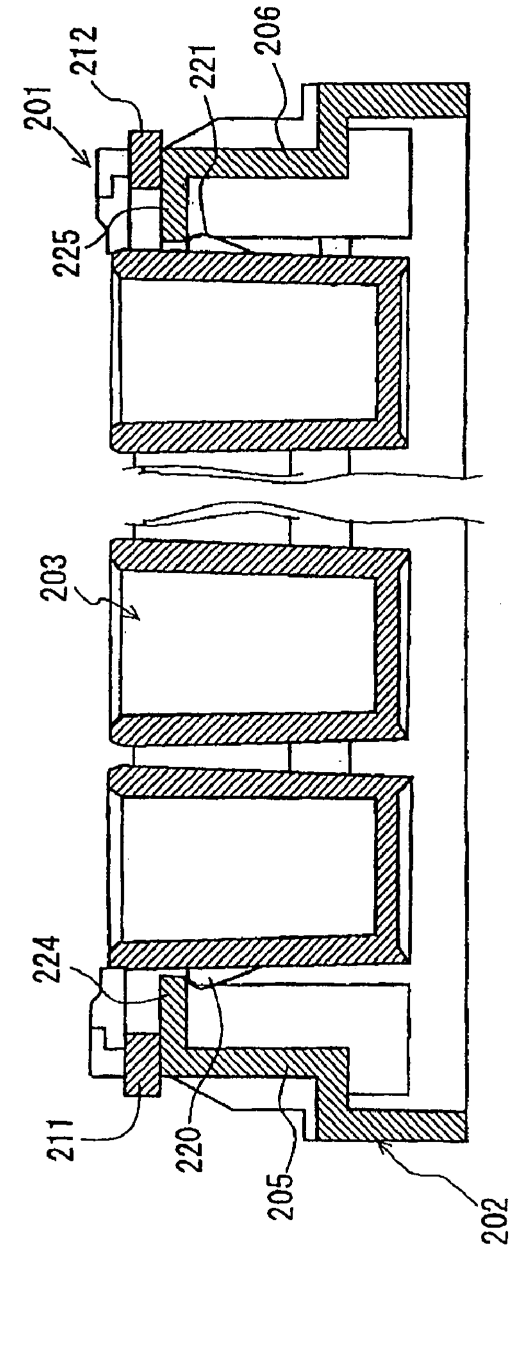
FIG.25 PRIOR ART
FIG. 25 is a cross-sectional view of a microplate of a second conventional example.

FIG. 22 is a cross-sectional view of the fluid handling section 52 of the strip plate 3 of a second specific example. In the fluid handling section 52 of the specific example, a through-hole 4*e* is formed on the bottom surface of the small diameter well 4*b* of the attachment well 4 in place of the minuscule well 4*d* formed on the bottom surface of the small diameter well 4*b* of the attachment well 4 in the fluid handling section 52 of the first specific example. The through-hole 4*e* is a circle (or a shape such as a rectangle) smaller than the bottom surface of the cylindrical component 53. Other configurations of the fluid handling section 52 of the specific example is the same as the fluid handling section 52 of the first specific example, and therefore, the same reference numbers are given. Explanations thereof are omitted.

In the fluid handling section 52 of the first specific example described above, the miniscule well 4*d* is formed on the bottom surface of the small diameter well 4*b* of the attachment well 4. As a result, a space preventing interference between the bottom surface of the cylindrical component 53 and the bottom surface of the attachment well 4 when the cylindrical component 53 is fitted into the small diameter well 4*b* is formed. However, when the fluid handling device 10 of the first specific example is used, for example, in an enzyme-linked immunosorbant assay (ELISA) method or the like and detection of a target material is performed by spectrophotometry, because the bottom surface of the fluid handling section 52 is a two-layer structure including the bottom surface of the cylindrical component 53 and the bottom surface of the attachment well 4, transmittance decreases and background (blank value) during absorbance measurement increases. Therefore, in the fluid handling section 52 of the second specific example, the through-hole 4*e* is formed on the bottom surface of the small diameter well 4*b* of the attachment well 4 to serve as a light-transmitting opening section, thereby preventing the blank value (background value) during absorbance measurement from increasing.

What is claimed is:

1. A fluid handling device comprising a plurality of rectangular planar-shaped strip plates on which a plurality of wells are formed in a single row, and a frame having a square planar-shaped space surrounded by four continuous side walls, the plurality of rectangular planar-shaped strip plates being detachably incorporated into the frame, thereby arranging the wells in a form of a matrix, wherein:

the strip plate includes shoulder sections on one section end side and another end section side in a longitudinal direction that are placed on upper end sections of a pair of opposing side walls among the four continuous side walls, and a concave-convex engaging section that engages with a locking section formed on a side surface positioned on one of the opposing pair of side walls which faces the planar-shaped space that is surrounded by the four continuous side walls using concavity and convexity;

and wherein when the strip plate is incorporated into the frame, the concave-convex engaging section engages with the locking section using concavity and convexity by the concave-convex engaging section deforming at least one side wall of the pair of side walls; and when the strip plate is removed from the frame, the engagement between the concave-convex engaging section and the locking section using concavity and convexity is released by the concave-convex engaging section deforming at least one side wall of the pair of side walls; and a slit is formed on the frame near a corner between at least one side wall of the pair of side walls and another side wall connected to the one side wall, so as to extend from an upper end section to a lower end section of the one side wall.

2. A fluid handling device comprising a plurality of rectangular planar-shaped strip plates on which a plurality of wells are formed in a single row, and a frame having a square planar-shaped space surrounded by four continuous side walls, the plurality of rectangular planar-shaped strip plates being detachably incorporated into the frame, thereby arranging the wells in a form of a matrix, wherein:

the strip plate includes shoulder sections on one section end side and another end section side in a longitudinal direction that are placed on upper end sections of a pair of opposing side walls among the four continuous side walls, and a concave-convex engaging section that engages with a locking section formed on a side surface positioned on one of the opposing pair of side walls which faces the planar-shaped space that is surrounded by the four continuous side walls using concavity and convexity;

and wherein when the strip plate is incorporated into the frame, the concave-convex engaging section engages with the locking section using concavity and convexity by the concave-convex engaging section deforming at least one side wall of the pair of side walls; and when the strip plate is removed from the frame, the engagement between the concave-convex engaging section and the locking section using concavity and convexity is released by the concave-convex engaging section deforming at least one side wall of the pair of side walls; and a slit is formed on the frame near a corner between at least one side wall of the pair of side walls and another side wall connected to the one side wall, so as to extend from an upper end section to a lower end section of the other side wall.

3. A fluid handling device comprising a plurality of rectangular planar-shaped strip plates on which a plurality of wells are formed in a single row, and a frame having a square planar-shaped space surrounded by four continuous side walls, the plurality of rectangular planar-shaped strip plates being detachably incorporated into the frame, thereby arranging the wells in a form of a matrix, wherein:

the strip plate includes shoulder sections on one section end side and another end section side in a longitudinal direction that are placed on upper end sections of a pair of opposing side walls among the four continuous side walls, and a concave-convex engaging section that engages with a locking section formed on a side surface positioned on one of the opposing pair of side walls which faces the planar-shaped space that is surrounded by the four continuous side walls using concavity and convexity;

and wherein when the strip plate is incorporated into the frame, the concave-convex engaging section engages with the locking section using concavity and convexity by the concave-convex engaging section deforming at least one side wall of the pair of side walls; and when the strip plate is removed from the frame, the engagement between the concave-convex engaging section and the locking section using concavity and convexity is released by the concave-convex engaging section deforming at least one side wall of the pair of side walls; and a thin-walled section is formed on the frame near a near between at least one side wall of the pair of side walls and another side wall connected to the one side wall, in a predetermined area from an upper end section to a lower end section of the one side wall.

* * * * *